(12) United States Patent
Chen et al.

(10) Patent No.: US 11,049,038 B2
(45) Date of Patent: Jun. 29, 2021

(54) METHODS AND SYSTEMS FOR OPTIMIZING QUANTUM CIRCUITS

(71) Applicant: ALIBABA GROUP HOLDING LIMITED, Grand Cayman (KY)

(72) Inventors: Jianxin Chen, Seattle, WA (US); Fang Zhang, Seattle, WA (US)

(73) Assignee: ALIBABA GROUP HOLDING LIMITED, George Town (KY)

( * ) Notice: Subject to any disclaimer, the term of this patent is extended or adjusted under 35 U.S.C. 154(b) by 0 days.

(21) Appl. No.: 16/795,416

(22) Filed: Feb. 19, 2020

(65) Prior Publication Data

US 2020/0311590 A1 Oct. 1, 2020

Related U.S. Application Data

(60) Provisional application No. 62/825,949, filed on Mar. 29, 2019.

(51) Int. Cl.
G06N 10/00 (2019.01)

(52) U.S. Cl.
CPC .................... *G06N 10/00* (2019.01)

(58) Field of Classification Search
None
See application file for complete search history.

(56) References Cited

U.S. PATENT DOCUMENTS

| 7,018,852 | B2 | 3/2006 | Wu et al. |
| 9,018,971 | B2 | 4/2015 | Eastin |

(Continued)

OTHER PUBLICATIONS

Amy et al., "Polynomial-Time T-Depth Optimization of Clifford+T Circuits Via Matroid Partitioning," IEEE Transactions on Computer-Aided Design of Integrated Circuits and Systems, vol. 33, No. 10, pp. 1476-1489 (Oct. 2014).

(Continued)

*Primary Examiner* — Jany Richardson
(74) *Attorney, Agent, or Firm* — Finnegan, Henderson, Farabow, Garrett & Dunner, LLP

(57) ABSTRACT

The present disclosure methods, systems and non-transitory computer readable media for optimizing quantum circuits. The methods include transforming an initial quantum circuit into a corresponding intermediate quantum circuit, wherein the intermediate quantum circuit is a first set of $$\frac{\pi}{4}$$

Pauli rotation gates followed by a first Clifford gate; and generating an updated quantum circuit having a second set of $$\frac{\pi}{4}$$

Pauli rotation gates followed by a second Clifford gate, by, for each $$\frac{\pi}{4}$$

Pauli rotation gate in the first set of $$\frac{\pi}{4}$$

(Continued)

Pauli rotation gates: inserting a new $\frac{\pi}{4}$- Pauli rotation gate after the second set of $\frac{\pi}{4}$- Pauli rotation gates, wherein the new $\frac{\pi}{4}$- Pauli rotation gate corresponds to the current $\frac{\pi}{4}$- Pauli rotation gate in the first set of $\frac{\pi}{4}$- Pauli rotation gates conjugated by the second Clifford gate and the conjugate transpose of the second Clifford gate, scanning through the second set of $\frac{\pi}{4}$- Pauli rotation gates to determine if there is a matching $\frac{\pi}{4}$- Pauli rotation gate before a non-commuting $\frac{\pi}{4}$- Pauli rotation gate, and responsive to determining that there is a matching $\frac{\pi}{4}$- Pauli rotation gate: removing the matching $\frac{\pi}{4}$- Pauli rotation gate and new $\frac{\pi}{4}$- Pauli rotation gate from the second set of $\frac{\pi}{4}$- Pauli rotation gates and, if the matching $\frac{\pi}{4}$- Pauli rotation gate and new $\frac{\pi}{4}$- Pauli rotation gate have opposite signs, replacing the second Clifford gate with a new Clifford gate, wherein the new Clifford gate corresponds to the current second Clifford gate conjugated by the new $\frac{\pi}{4}$- Pauli rotation gate.

20 Claims, 5 Drawing Sheets

(56) References Cited

U.S. PATENT DOCUMENTS

| | | | |
|---|---|---|---|
| 9,514,415 B2 | 12/2016 | Bocharov et al. | |
| 9,633,313 B2 | 4/2017 | Svore et al. | |
| 10,031,791 B1 | 7/2018 | Wallman et al. | |
| 10,171,088 B1* | 1/2019 | Kim | G06N 20/00 |
| 2017/0032272 A1* | 2/2017 | Bocharov | G06F 17/16 |
| 2019/0095561 A1 | 3/2019 | Pednault et al. | |
| 2020/0134107 A1* | 4/2020 | Low | G06N 10/00 |

OTHER PUBLICATIONS

Amy et al., "T-count optimization and Reed-Muller codes," arXiv preprint arXiv:1601.07363, 19 pages (2016).
Barenco et al., "Elementary gates for quantum computation," Phys. Rev. A 52, 3457, 31 pages (1995).
Campbell et al., "Roads towards fault-tolerant universal quantum computation," Nature 549, 172, 9 pages (2017).
Childs et al., "Toward the first quantum simulation with quantum speedup," PNAS, vol. 115, No. 38, pp. 9456-9461 (2018).
Cross et al., "Validating quantum computers using randomized model circuits," arXiv preprint arXiv:1811.12926, 12 pages (2018).
Cuccaro et al., "A new quantum ripple-carry addition circuit," arXiv preprint quant—ph/0410184, 9 pages (2004).
Dawson et al., "The Solovay-Kitaev Algorithm," Quantum Information and Computation, 15 pages (2005).

(56) References Cited

OTHER PUBLICATIONS

Draper et al., "A Logarithmic-Depth Quantum Carry-Lookahead Adder," Quantum Info. Comput., vol. 6, No. 351, 31 pages (2006).
Fowler Austin G., "Constructing arbitrary Steane code single logical qubit fault-tolerant gates," Quantum Info. Comput. vol. 11, No. 867, 8 pages (2011).
Fowler et al., "Surface codes: Towards practical large-scale quantum computation," Phys. Rev. A. vol. 86, 54 pages (2012).
Fowler et al., Surface code implementation of block code state distillation, Scientific Reports, vol. 3, No. 1939, 6 pages (2013).
Gosset et al., "An Algorithm for the T-Count," arXiv preprint arXiv:1308.4134, 12 pages 2013).
Heyfron et al., "An Efficient Quantum Compiler that Reduces T Count," Quantum Science and Technology, vol. 4, No. 015004, 19 pages (2018).
Kissinger et al., "Reducing T-count with the ZX-calculus," arXiv preprint arXiv:1903.10477, 17 pages (2019).
Kliuchnikov, et al., "Practical Approximation of Single-Qubit Unitaries by Single-Qubit Quantum Clifford and T Circuits," IEEE Transactions on Computers, vol. 65, No. 1, pp. 161-172 (2016).
Kliuchnikov, et al., "Asymptotically optimal approximation of single qubit unitaries by Clifford and T circuits using a constant number of ancillary qubits," Physical review letters 110, 5 pages (2013).
Li et al., "Tackling the Qubit Mapping Problem for NISQ-Era Quantum Devices," arXiv preprint arXiv:1809, 13 pages (2018).
Markov et al., "Constant-Optimized Quantum Circuits for Modular Multiplication and Exponentiation," Quantum Info. Comput. vol. 12, No. 361, 29 pages (2012).
Nebe et al., "The Invariants of the Clifford Groups," Designs, Codes and Cryptography, Vo. 24, No. 99, 24 pages (2001).
Nielsen et al., "Quantum Computation and Quantum Information," Cambridge University Press, 704 pages (2000).
O'Gorman et al., "Quantum computation with realistic magic state factories," Physical Review A., vol. 95, 22 pages (2017).
Ross et al., "Optimal ancilla-free Clifford+T approximation of z-rotations," arXiv preprint arXiv:1403.2975, 40 pages (2014).
Selinger et al., "Efficient Clifford+T approximation of single-qubit operators," arXiv preprint arXiv:1212.6253, 17 pages (2012).
Siraichi et al., "Qubit Allocation," Proceedings of the 2018 International Symposium on Code Generation and Optimization, pp. 113-125 (2018).
Takahashi et al., "Quantum Addition Circuits and Unbounded Fan-Out," Quantum Info. Comput., vol. 10, No. 872, 17 pages (2010).
Tannu et al., Not all Qubits are Created Equal, A case for Variability-Aware Policies for NISQ-Era Quantum Computers, arXiv preprint arXiv:1805.10224, 12 pages (2018).
Van Meter et al., "Fast Quantum Modular Exponentiation," Physical Review A. vol. 71, 12 pages (2005).
Vedral et al., "Quantum Networks for Elementary Arithmetic Operations," Physical Review A., vol. 54, No. 147, 12 pages (1996).
Zhang et al., "Optimizing T gates in Clifford+T circuit as $\pi/4$ rotations around Paulis," arXiv:1903.12456v1, 10 pages (2019).
PCT International Search Report and Written Opinion dated Jun. 16, 2020 issued in corresponding International Application No. PCT/US2020/022963 (13 pgs.).
Zhang et al., "Optimizing T gates in Clifford+T circuit as $\pi/4$ rotations around paulis," retrieved from the internet: <URL: https://arxiv.org/abs/1903.12456>., 10 pages, Apr. 2019.

* cited by examiner

| Benchmark | Original | | Toptimizer (Present Disclosure) | |
|---|---|---|---|---|
| | CNOT-Count | T-Count | CNOT-Count | T-Count |
| Mod $5_4$ | 32 | 28 | 28 | 8 |
| VBE-Adder$_3$ | 80 | 70 | 70 | 24 |
| CSLA-MUX$_3$ | 90 | 70 | 80 | 62 |
| CSUM-MUX$_9$ | 196 | 196 | 168 | 84 |
| QCLA-COM$_7$ | 215 | 203 | 186 | 95 |
| QCLA-MOD$_7$ | 441 | 413 | 382 | 237 |
| QCLA-Adder$_{10}$ | 267 | 238 | 233 | 162 |
| Adder$_8$ | 466 | 399 | 409 | 173 |
| RC-Adder$_6$ | 104 | 77 | 93 | 47 |
| Mod-Red$_{21}$ | 122 | 119 | 105 | 73 |
| Mod-Mult$_{55}$ | 55 | 49 | 48 | 35 |
| $\Lambda_3(X)$ | 28 | 28 | 24 | 16 |
| | 21 | 21 | 18 | 15 |
| $\Lambda_4(X)$ | 56 | 56 | 48 | 28 |
| | 35 | 35 | 30 | 23 |
| $\Lambda_5(X)$ | 84 | 84 | 72 | 40 |
| | 49 | 49 | 42 | 31 |
| $\Lambda_{10}(X)$ | 224 | 224 | 192 | 100 |
| | 119 | 119 | 102 | 71 |
| GF($2^4$)-Mult | 115 | 112 | 99 | 68 |
| GF($2^5$)-Mult | 179 | 175 | 154 | 111 |
| GF($2^6$)-Mult | 257 | 252 | 221 | 150 |
| GF($2^7$)-Mult | 349 | 343 | 300 | 217 |
| GF($2^8$)-Mult | 469 | 448 | 405 | 264 |
| GF($2^9$)-Mult | 575 | 567 | 494 | 351 |
| GF($2^{10}$)-Mult | 709 | 700 | 609 | 410 |
| GF($2^{16}$)-Mult | 1837 | 1792 | 1581 | 1040 |
| GF($2^{32}$)-Mult | 7292 | 7168 | 6268 | 4128 |
| GF($2^{64}$)-Mult | 28860 | 28672 | 24765 | 16448 |
| Average Reduction | * | * | +0.00%[b] | -42.67% |
| Maximum T-Count Reduction | * | * | +0.00%[b] | -71.43% |
| Maximum CNOT-Count Increase | * | * | +0.00%[b] | -71.43% |

Notes:
[a] T-Count better than reported in some references.
[b] The difference between our CNOT-count and the original CNOT-count reported in Column 2 is caused by the different decompositions of Toffoli gates. In the example optimization procedure, CNOT-count was not further

FIG. 4

METHODS AND SYSTEMS FOR OPTIMIZING QUANTUM CIRCUITS

CROSS-REFERENCE TO RELATED APPLICATION

This disclosure claims the benefit of priority to U.S. Provisional Patent Application No. 62/825,949, filed on Mar. 29, 2019, which is incorporated herein by reference in its entirety.

TECHNICAL FIELD

The present disclosure generally relates to quantum computing, and more particularly, to methods, systems and non-transitory computer readable media for optimizing quantum circuits.

BACKGROUND

Quantum computers offer the ability to perform certain tasks impracticable for classical computers. These tasks would bring enormous advances to numerous engineering disciplines and enable valuable goals such as the discovery of new materials, the synthesis of better pharmaceuticals, and the creation of more energy dense batteries. However, present day quantum computers have severe limitations on the algorithms they can successfully implement. Therefore, optimizing quantum algorithms is essential to enable the algorithms to have sufficient resources to solve useful problems when implemented on real-world quantum hardware.

SUMMARY OF THE DISCLOSURE

The present disclosure methods, systems and non-transitory computer readable media for optimizing quantum circuits. The methods include transforming an initial quantum circuit into a corresponding intermediate quantum circuit, wherein the intermediate quantum circuit is a first set of $$\frac{\pi}{4}-$$

Pauli rotation gates followed by a first Clifford gate; and generating an updated quantum circuit having a second set of $$\frac{\pi}{4}-$$

Pauli rotation gates followed by a second Clifford gate, by, for each $$\frac{\pi}{4}-$$

Pauli rotation gate in the first set of $$\frac{\pi}{4}-$$

Pauli rotation gates: inserting a new $$\frac{\pi}{4}-$$

Pauli rotation gate after the second set of $$\frac{\pi}{4}-$$

Pauli rotation gates, wherein the new $$\frac{\pi}{4}-$$

Pauli rotation gate corresponds to the current $$\frac{\pi}{4}-$$

Pauli rotation gate in the first set of $$\frac{\pi}{4}-$$

Pauli rotation gates conjugated by the second Clifford gate and the conjugate transpose of the second Clifford gate, scanning through the second set of $$\frac{\pi}{4}-$$

Pauli rotation gates to determine if there is a matching $$\frac{\pi}{4}-$$

Pauli rotation gate before a non-commuting $$\frac{\pi}{4}-$$

Pauli rotation gate, and responsive to determining that there is a matching $$\frac{\pi}{4}-$$

Pauli rotation gate: removing the matching $$\frac{\pi}{4}-$$

Pauli rotation gate and new $$\frac{\pi}{4}$$

Pauli rotation gate from the second set of $$\frac{\pi}{4}$$

Pauli rotation gates and, if the matching $$\frac{\pi}{4}$$

Pauli rotation gate and new $$\frac{\pi}{4}$$

Pauli rotation gate have opposite signs, replacing the second Clifford gate with a new Clifford gate, wherein the new Clifford gate corresponds to the current second Clifford gate conjugated by the new $$\frac{\pi}{4}$$

Pauli rotation gate.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that the foregoing general description and the following detailed description are exemplary and explanatory only, and are not restrictive of the invention, as claimed.

BRIEF DESCRIPTION OF THE DRAWINGS

Embodiments and various aspects of the present disclosure are illustrated in the following detailed description and the accompanying figures. Various features shown in the figures are not drawn to scale.

FIG. 4 depicts benchmarking results for an exemplary embodiment against conventional solutions, according to some embodiments of the present disclosure.

DETAILED DESCRIPTION

Figure 1:
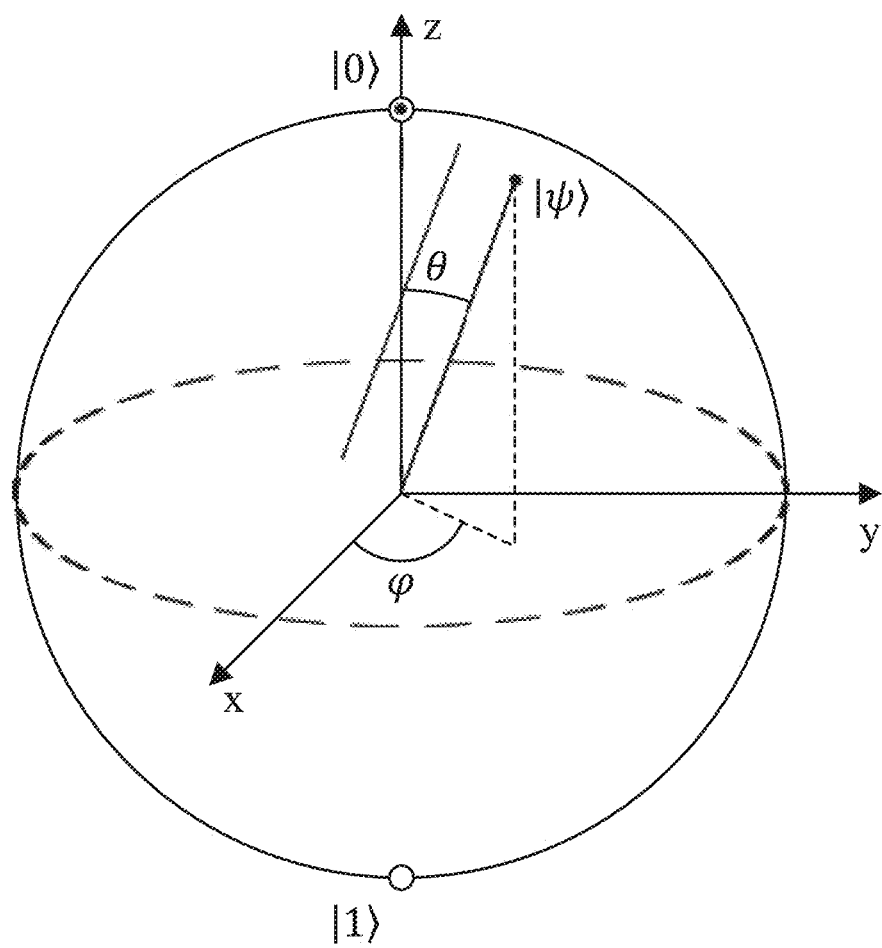
FIG. 1 is a simplified diagram illustrating the Bloch sphere of a single qubit.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Computers are ubiquitous in modern-day society. In one way or another, computers are involved in virtually every aspect of life. This includes direct involvement—such as smartphones and laptops—and indirect involvement—such as the microcontrollers in cars or the control systems in water purification plants. The ubiquity and importance of computers is similarly reflected across virtually every industry. Due to this importance, computers, as a class of things, are enormously valuable to society. And in large part, this importance is predicated on the ability of computers—what they can do. In particular, if a computer can perform a task, it usually can do so much faster and at a much larger scale than humans can. This is extraordinarily beneficial to society, as these tasks can now be completed without human involvement (and usually with much lower cost), freeing up human beings to focus their efforts on other tasks. Thus, an extremely important aspect of computers is what tasks a computer can perform.

Broadly speaking, the abilities of computers are constrained (or, from the reverse view, enabled) by two domains: hardware and software. In essence, a computer—in the sense of an abstract, idealized machine capable of performing "calculations"—must be implemented on some type of hardware (e.g., physical configuration of matter) to be used. Because it is physical, whatever hardware is used to implement the computer is subject to various limitations imposed by physics. In particular, physics imposes limits such that any hardware used to implement a computer will necessarily create an upper bound on the computer's performance characteristics, such as the amount of memory available or the number of operations-per-second.

Once a computer is physically implemented, it is essentially idle until it is given something to "calculate." In other words, a computer does nothing until instructed otherwise. Thus, to have a computer solve a task, the computer must be then provided with a set of instructions to follow which, when followed, accomplish the desired task. This set of instructions is called a program, which, collectively constitute software. In turn, the ability to create a program to solve a task is largely constrained by two domains: mathematical algorithms and the knowledge of how a given task is solved. While somewhat fuzzy, a mathematical algorithm can be thought of as the basic building blocks of a program—it is a series of steps to solve a mathematical problem. This is distinct from a program, which is a series of steps to solve some (not necessarily mathematical) "real-world" problem. To create a program to solve a task, a programmer uses some combination of algorithms to provide a series of steps that, if followed, solve the desired task. This requires the computer programmer to know what algorithms that, if used, can perform the desires steps. Crucially, it also requires the computer programmer to know what steps are required to solve the desired task. Without this knowledge, the program solving a given task cannot be created.

Usually, each of these three domains advance incrementally—transistors shrink, making computers a little faster, and new algorithms are designed, making programs a little more efficient. This, in turn, means that usually the increase in a computer's abilities are similarly incremental. Occasionally, however, there is an advance in one domain that sharply increases the abilities of a computer. One such advance is the rise of machine learning, which involves creating systems that are capable of finding ("learning") the steps necessary to solve a problem autonomously. This has led to the ability to solve tasks previously not sufficiently understood to create an explicit program. Another extremely promising avenue for a similar advance is the creation of a quantum computer.

Quantum computers offer the ability to perform certain tasks (equivalently, solve certain problems) thought to be intractable to classical computers, including any possible future classical computers. To understand why, it is useful to have a brief overview of computational complexity theory. Computational complexity theory is a branch of theoretical computer science that focuses on classifying "computational problems" according to their "difficulty." A "computational problem" can be conceptualized as determining a specific property of any instance of some class mathematical objects, such as a graph, number, or string. While seemingly abstract, any real-world task can ultimately be broken down into determining specific properties of some corresponding mathematical objects. Additionally, a particular instance of a mathematical object being solved (with respect to some computational problem) is usually conceptualized as a sequence of bits, e.g., 1s and 0s, of length n, where the size of n depends on the particular instance being solved.

The "difficulty" of a "computational problem" is then defined by the number of resources required by the best algorithm to, when given an input (i.e., an instance of a relevant mathematical object), determine the specific property of interest. In general, the amount of resources required by an algorithm to solve a computational problem for some input usually varies as a function of n. For example, an algorithm may take $5n^3+12n^2+2n+\log n+113$ number of steps for an input of size n. Generally, however, only the asymptotic complexity of an algorithm is evaluated, using what is known as big O notation. In big O notation, the focus is on the asymptotic behavior of an algorithm as n tends towards infinity. More specifically, big O notation focuses on the growth rate of a function as n tends towards infinity. Because $$\lim_{x \to \infty} \frac{x^n}{x^m} = 0$$

when $x^n < x^m$ and because any coefficients are constant, only the fastest growing factor of n are considered for an algorithm under big O notation. For example, in big O notation, the number of steps used by the algorithm considered above would be $O(n^3)$. An algorithm is generally thought to be useful if it has an asymptotic complexity of $O(n^k)$ number of steps for some k (e.g., has no more than polynomial growth) and is generally thought to be impractical if it takes $O(k^n)$ for some k (e.g., has more than polynomial growth). Any "computational problem" whose best possible algorithm has an asymptotic complexity of $O(k^n)$ or more is said to be intractable (i.e., mathematically possible, but physically unrealizable).

By far, the two most relevant resources measured are the amount of "time" and the amount of "storage" an algorithm requires to solve a particular "computational problem" for a particular input. However, because algorithms must be implemented on some system to be used and because the primitives available to an algorithm depend on the system used, measuring the amount of "time" or "storage" used by the algorithm must be done with respect to some "model of computation," which, in basic terms, is an idealized model of some computer system. The default model used for this purpose is known as a Turing machine. While the exact amount of resources consumed by an algorithm may vary between a Turing machine and the real-world computer an algorithm is implemented on, this is usually unimportant when evaluating an algorithm using big O notation, since the architectural differences do not usually affect an algorithms asymptotic behavior. The reason for this is that, generally speaking, a Turing machine can implement the primitives of any real-world system using only a constant number of its own primitives. Thus, while real world computers may be somewhat more or less efficient than a Turing machine, it is only by a constant coefficient.

Quantum computers, however, break this assertion. It turns out that, by taking advantage of certain aspects of quantum mechanics, the primitives available in a quantum computer cannot be implemented on a Turing machine using a constant number of the Turing machine's primitives. What this means is that, for certain problems, a quantum computer (or, its idealized mathematical counterpart, a quantum Turing machine) is able to solve problems in a polynomial number of steps that classical computers can only solve in an exponential number of steps. This means that, for certain "computational problems," the computational complexity with respect to a quantum computer (the idealized analog of which is the quantum Turing machine) is polynomial with respect to the size of the input rather than exponential as it is with a classic Turing machine. This allows quantum computers to solve problems that are essentially unsolvable by classical computers.

Given their ability to solve problems that are essentially unsolvable by classical computers, quantum computers are capable of bringing enormous benefit to society. As one example, a quantum computer would be vastly more capable of simulating the dynamics of molecules—which are quantum in nature—which could bring enormous advances to any engineering discipline that depends on the properties of small molecules. To name just a few domains, this could lead to the creation of new materials, the synthesis of better pharmaceuticals, and the creation of more energy dense batteries.

To understand the advantage of quantum computers, it is useful to understand how they contrast to classical computers. A classical computer operates according to digital logic. Digital logic refers to a type of logic system that operates on units of information called bits. A bit may have one of two values, usually denoted 0 and 1, and is the smallest unit of information in digital logic. Operations are performed on bits using logic gates, which take one or more bits as input and give one or more bits as output. Typically, a logic gate usually only has one bit as output (though this single bit may be sent as input to multiple other logic gates) and the value of this bit usually depends on the value of at least some of the input bits. In modern-day computers, logic gates are usually composed of transistors and bits are usually represented as the voltage level of wires connecting to the transistors. A simple example of a logic gate is the AND gate, which (in its simplest form) takes two bits as input and gives one bit as output. The output of an AND gate is 1 if the value of both inputs is 1 and is zero otherwise. By connecting the inputs and outputs of various logic gates together in specific ways, a classical computer can implement arbitrarily complex algorithms to accomplish a variety of tasks.

On a surface level, quantum computers operate in a similar way to classical computers. A quantum computer operates according to a system of logic that operates on units of information called qubits (a portmanteau of "quantum" and "bit"). A qubit is the smallest unit of information in quantum computers and the qubit may have any linear combination of two values, usually denoted $|0\rangle$ and $|1\rangle$. In other words, the value of a qubit, denoted $|\psi\rangle$, could be equal to $\alpha|0\rangle + \beta|1\rangle$ for any combination of $\alpha$ and $\beta$ where $\alpha$ and $\beta$ are complex numbers and $|\alpha|^2+|\beta|^2=1$. Operations are performed on qubits using quantum logic gates, which take one or more qubits as input and gives one or more qubits as output. A quantum gate is almost always reversible, meaning that, using solely the output from the gate and knowledge of the transformation the gate applies, it is technically possible, though not necessarily practically possible, to recover the input to the gate. This necessitates that the number of outputs equals (or exceeds) the number of input gates. Thus, quantum gates usually have the same number of output qubits as the quantum gates have input qubits. A quantum gate may be represented as a matrix.

The ability to solve certain problems in fewer greater ability of quantum computers largely stems from the greater number of values a qubit can assume, or, in other words, stems from the ability of qubits to be in a superposition of states. Additionally, the number of values a group of qubits can jointly assume grows exponentially with the number of qubits. For example, considering a system of two qubits, taken alone the first qubit can be in the state $\alpha|0\rangle+\beta|1\rangle$ for some $\alpha$ and $\beta$ and the second qubit can be in the state $\gamma|0\rangle+\delta|1\rangle$ for some $\gamma$ and $\delta$. However, taking the qubits together—i.e., considering when the two qubits are entangled—the joint system composed by the qubits can be in a linear combination of the states $\alpha\gamma|00\rangle+\alpha\delta|01\rangle+\beta\gamma|10\rangle+\beta\delta|11\rangle$ (with $|\alpha\gamma|^2+|\alpha\delta|^2+|\beta\gamma|^2+|\beta\delta|^2=1$). Thus, two qubits can be in a linear combination of four states, rather than two. Similarly, entangling a third qubit (which can be in the state $\zeta|10\rangle+\eta|1\rangle$ for some $\zeta$ and $\eta$), allows the joint system composed by the qubits to be in a linear combination of eight states, e.g., the states $\alpha\gamma\zeta|000\rangle+\alpha\gamma\eta|001\rangle+\alpha\delta\zeta|010\rangle+\alpha\delta\eta|011\rangle+\beta\gamma\zeta|100\rangle+\beta\gamma\eta|101\rangle+\beta\delta\zeta|110\rangle+\beta\delta\eta|111\rangle$ (with $|\alpha\gamma\zeta|^2+|\alpha\gamma\eta|^2+|\alpha\delta\zeta|^2+|\alpha\delta\eta|^2+|\beta\gamma\zeta|^2+|\gamma\eta|^2+|\beta\delta\zeta|^2+|\beta\delta\eta|^2=1$). In general, a system of n entangles qubits can be in a linear combination of $2^n$ states, $$\text{e.g., } x_1|\underbrace{00\ldots00}_{n}\rangle + x_2|\underbrace{00\ldots01}_{n}\rangle + \cdots + x_{n-1}|\underbrace{11\ldots10}_{n}\rangle + x_n|\underbrace{11\ldots11}_{n}\rangle.$$

This ability, combined with the ability of qubits (or groups of entangled qubits) to constructively and destructively interfere with one another, allows quantum computers to have an exponential speed advantage over classical computers for some problems.

However, while powerful, maintaining the qubits in a necessary state (e.g., entangled with other qubits) is difficult, as the states are fragile and easily disrupted by outside environmental factors. Once disrupted, whatever calculation that was being performed is lost and must be restarted. While improving, the present ability to prepare each qubit in the necessary state and to perform the necessary sequence of operations on them is limited. For example, most extant systems can only prepare and entangle a few dozen qubits and can only perform a few rounds of operations on these qubits before the system is disrupted by outside factors. To help combat the fragility of the necessary quantum states, many quantum computer systems implement a form of fault tolerance. The primary form of fault tolerance used is to create a "logical qubit," which is made up of several redundant physical qubits and, as a consequence, is more robust.

However, given the requirements to build a system capable of harnessing the quantum nature of reality, the quantum computer systems of today are of very limited size and capability. First theorized to be superior to classical computers in the early 1980s, it is only in the last several years that actual physical implementations of quantum computers have been developed. While slowly improving, current and near-future quantum computers struggle to provide improvements over their classical counterparts. This further heightens the importance of designing and implementing efficient quantum algorithms. Two principle ways of measuring the efficiency of a quantum circuit implementation are the number of physical qubits needed, which may be referred to as the space cost, and the protocol (algorithm/circuit) implementation time, which may be referred to as the time cost. These two metrics are sometimes considered together as the space-time cost of a particular quantum protocol/algorithm/circuit. Thus, extant quantum computers are limited in two key respects. First, they generally have only a small number of qubits, limiting the complexity of the calculations they can perform. Second, extant quantum computers are also limited by the amount of time (or, equivalently, the number of sequential steps) a calculation can take before the calculation must finish, i.e., be read and a classical value obtained. Thus, quantum algorithms for extant quantum computers should utilize as few calculations as possible and finish as quickly as possible. In other words, quantum algorithms should be as efficient as possible.

Given the low-level nature of most current quantum systems, quantum algorithms are typically expressed in terms of their underlying quantum circuits. In turn, quantum circuits are composed of quantum gates, the fundamental components that directly manipulate qubits. Unlike classical logic gates, of which there is only finite variety (for a given number of input and output bits), there is an infinite number of quantum gates that can act on any particular number of qubits. The reason for this is that the values a qubit can assume are continuous, e.g., infinite, whereas the values a bit can assume are finite, e.g., 2. A quantum gate may thus act to transform a qubit an infinite number of ways. In fact, there are an uncountably infinite number of unitary transformations that a quantum gate could represent (i.e., there are an uncountably infinite number of quantum gates). Despite this variety, there are finite sets of quantum gates (such as sets containing 5 quantum gates) which have the property of universality, meaning that the set of quantum gates can approximately implement any other set of quantum gates to an arbitrary degree of precision (given enough quantum gates). While there is an infinite amount of collections of quantum gates are universal, a few sets are particularly prevalent in the field of quantum computation. One such set of universal quantum gates is known as a Clifford+T circuit, which comprises various combinations of Clifford gates and T gates.

To understand Clifford+T circuits, it is helpful to understand some background on quantum computing. One popular way of visualizing the value of a qubit is via a Bloch sphere. As its name suggests, a Bloch sphere is a sphere, where the value of a qubit is represented as a point on the surface of the sphere. Representing a position on the surface of a sphere takes two values (e.g., latitude and longitude for coordinates on earth). For a qubit, whose value is an imaginary number (e.g., a+bi), these two values are the real part (e.g., a) and the imaginary part (e.g., bi). One particular set of important quantum gates, known as the Pauli operators or Pauli gates, can then be understood as rotations around the three principle axes of the Bloch sphere. There are four Pauli operators, called I, X, Y, and Z where I is the identity operator and X, Y, and Z represent 180° rotations around the x-axis, y-axis, and z-axis of the Bloch sphere, respectively. The Pauli matrices/operators for a single qubit are $$I = \begin{pmatrix} 1 & 0 \\ 0 & 1 \end{pmatrix},$$

$$X = \begin{pmatrix} 0 & 1 \\ 1 & 0 \end{pmatrix},$$

$$Y = \begin{pmatrix} 0 & -i \\ i & 0 \end{pmatrix}, \text{ and}$$

$$Z = \begin{pmatrix} 1 & 0 \\ 0 & -1 \end{pmatrix}.$$

The set of Pauli operators on n qubits may be defined as $\mathcal{P}_n = \{\sigma_1 \otimes \ldots \otimes \sigma_n | \sigma_i \in \{I, X, Y, Z\}\}$ and $|\mathcal{P}_n| = 4^n$. For a set of n qubits there are $4^n$ Pauli matrices; one for each possible tensor product, in the form $\{\sigma_1 \otimes \ldots \otimes \sigma_n\}$, of the single qubit Pauli matrices, i.e., ($\sigma_i \in [I, X, Y, Z]$). Subscripts are generally used to indicate the qubits on which an operator acts. For example, in a 3-qubit system, we have Qubit$_1$, Qubit$_2$, and Qubit$_3$. To represent the Pauli X gate acting on the first qubit and a Pauli Z operator acting on the second qubit, one writes $X_1 Z_2 = X_1 Z_2 I_3 = X_1 \times Z_2 \times I_3 = (X \otimes I \otimes I) \times (I \otimes Z \otimes I) \times (I \otimes I \otimes I) = X \otimes Z \otimes I$.

FIG. 1 is a simplified diagram illustrating the Bloch sphere of a single qubit as just described. According to FIG. 1, the value a qubit may assume may be represented as the point on the surface of a sphere, shown here as ψ, with the value being defined by angles φ and θ. The Bloch sphere may be conceptualized as existing in a 3-dimensional space, with coordinate axis x, y, and z, respectively. The Pauli X gate, Pauli Y gate, and Pauli Z gate can then be understood as causing the point representing the value of the qubit to rotate by 180° around the x-axis, y-axis, and z-axis, respectively.

As is relevant here, a Clifford gate (or Clifford operator) is defined in relation to $\mathcal{C}$ the Pauli operators. For a Clifford group operating on n qubits, designated as $\mathcal{C}_n$, the Clifford gates composing the group are $\{U \in U(2^n) | \forall \sigma \in \pm P_n \setminus \{I^{\otimes n}\} \Rightarrow U\sigma U^\dagger \in \pm P_n \setminus \{I^{\otimes n}\}\}$. Essentially, the Clifford gates for a particular number of qubits are those gates that, when a Pauli gate is multiplied on the left by the gate and on the right by the gates Hermitian Adjoint, result in a gate that is also a Pauli matrix. This property is beneficial in designing error-correcting quantum codes. For the Clifford group operating on 1 qubit, i.e., $\mathcal{C}_1$, the Clifford group may be generated using the Hadamard gate, designated H, and the phase gate, designated S, where $$H = \frac{1}{\sqrt{2}} \begin{pmatrix} 1 & 1 \\ 1 & -1 \end{pmatrix} \text{ and } S = \begin{pmatrix} 1 & 0 \\ 0 & i \end{pmatrix}.$$

In other words, a combination of Hadamard gates phase gates are sufficient to implement all of the Clifford group $\mathcal{C}_1$. For the Clifford group operating on two or more qubits, e.g., $\mathcal{C}_2$, the Clifford group may be generated by the Hadmard gate and phase gate, in conjunction with the controlled not gate, designated CNOT, where $$CNOT = \begin{pmatrix} 1 & 0 & 0 & 0 \\ 0 & 1 & 0 & 0 \\ 0 & 0 & 0 & 1 \\ 0 & 0 & 1 & 0 \end{pmatrix} (\text{e.g., } CNOT = (|0\rangle\langle 0| \otimes I + |1\rangle\langle 1| \otimes X)).$$

However, Clifford gates alone are not sufficient for a general-purpose quantum computer. However, the addition of a gate called the T-gate, also known as a π/4 gate, makes the complete circuit universal. The T-gate is defined as $$T = \begin{pmatrix} 1 & 0 \\ 0 & e^{i\pi/4} \end{pmatrix}.$$

The T gate may also be defined as a π/4 phase rotation around the single-qubit Pauli Z:

$$T = |0\rangle\langle 0| + e^{i\pi/4}|1\rangle\langle 1| = \frac{1 + e^{i\pi/4}}{2}I + \frac{1 - e^{i\pi/4}}{2}Z.$$

In essence, a quantum circuit composed of only Hadamard gates, phase gates, controlled not gates and T gates are universal and sufficient for implementing a general-purpose quantum computer. Since a circuit composed of gates U ∈{H, S, CNOT, T} is universal and has several beneficial properties, many proposed and implemented extant real world quantum circuits are composed of these types of gates. Such a circuit can be referred to as a Clifford+T circuit.

An important consideration for Clifford+T circuits is the number of T gates used by the circuit. Generally speaking, in the context of quantum circuits, the "efficiency" of a quantum circuit depends on the metrics used (e.g., the "choice function" used). In turn, the metrics (e.g., "choice function") used may depend on the architecture of the hardware (e.g., gate set) being considered. For Clifford+T circuits, the usual measure for efficiency is the number of T gates, which is called the T-count. The reason for the importance of the T-count in measuring the efficiency of Clifford+T circuits is that T gates tend to be several orders of magnitude more expensive (in terms of number of logical of physical qubits needed to implement) than Clifford gates. Thus, the T-count of a quantum circuit tends to have a greater impact on efficiency than any of the other quantum gates. Therefore, optimizing T gates is generally the main focus in optimizing Clifford+T circuits.

For example, some previous solutions (such as some extant compilers) attempt to lower the T-count of a quantum circuit by using ancillary qubits. However, existing quantum hardware renders the use of ancillary qubits expensive, limiting the complexity (and thus use) of the actual quantum algorithm. Ancillary qubits may thus have a significant impact on the efficiency of quantum algorithms and minimizing this impact is known as "qubit allocation" or "quantum scheduling". Given the variation in the reliability (e.g., error rates) of qubits, transfer between gates, or even the quantum system in general, implementing a given circuit on near-term hardware is already very complicated. This complexity is already increased when attempting to optimize a given circuit to achieve better performance on near-term hardware. Adding the problem of qubit allocation makes the problem even more difficult, on top of the reduced efficiency ancillary qubits produce in any quantum circuit they are employed in.

Other previous solutions attempt to exactly compute the best possible by conducting a brute force search utilizing a meet-in-the-middle approach. While these solutions technically ensure optimality, they have an exponential running time, making them inefficient and unsuitable for realistic or useful quantum circuits. Other previous solutions, such as Tpar, attempt to optimize the T-depth of a quantum circuit by resynthesizing T gates in each CNOT+T section and by cancelling pairs of T gates that were moved adjacent to one another. This approach yields a suboptimal quantum circuit, however, because it deals with Hadamard gates H by synthesizing all T gates that will not be computable before synthesizing the H gate. This leads to a suboptimal circuit because some of the T gates may become "computable" again after the next Hadamard gate.

Additionally, other previous solution, such as RM, also attempts to optimize the T-count of a quantum circuit by optimizing CNOT+T sections. This approach attempts to exploit the fact that optimizing T-count in Clifford+T circuits may be equivalent to the minimum distance decoding problem of certain Reed-Muller codes. This decoding problem is hard, meaning only approximate Reed-Muller decoders exist, leading to solutions. Additionally, this approach also suffers from the same handing of Hadamard gates the previous method, leading to further inefficiencies in the generated quantum circuit. Other previous solutions, such as T-Opt, attempt to use gadgetization to deal with the Hadamard gates. This approach attempts to eliminate Hadamard gates from the first part of the circuit using an ancilla beginning in the |+⟩ state, which is later measured and used to classically control a Clifford gate (which may not be a Pauli gate, so the quantum-controlled version may not be a Clifford gate). This method is heuristic based, however, yielding suboptimal quantum circuits.

A general drawback in these conventional systems is that they rely on explicit transformations to attempt to reduce the T-count of a quantum circuit. However, by relying on explicit transformations, the representation of the circuit may affect the result. In other words, equivalent quantum circuits described in different terms may be optimized differently than one another by conventional systems. For example, the conventional solution Tpar attempts to optimize the T-depth of a quantum circuit by resynthesizing T gates in each CNOT+T section and by cancelling pairs of T gates that were moved adjacent to one another, which is an explicit transformation.

Figure 2:
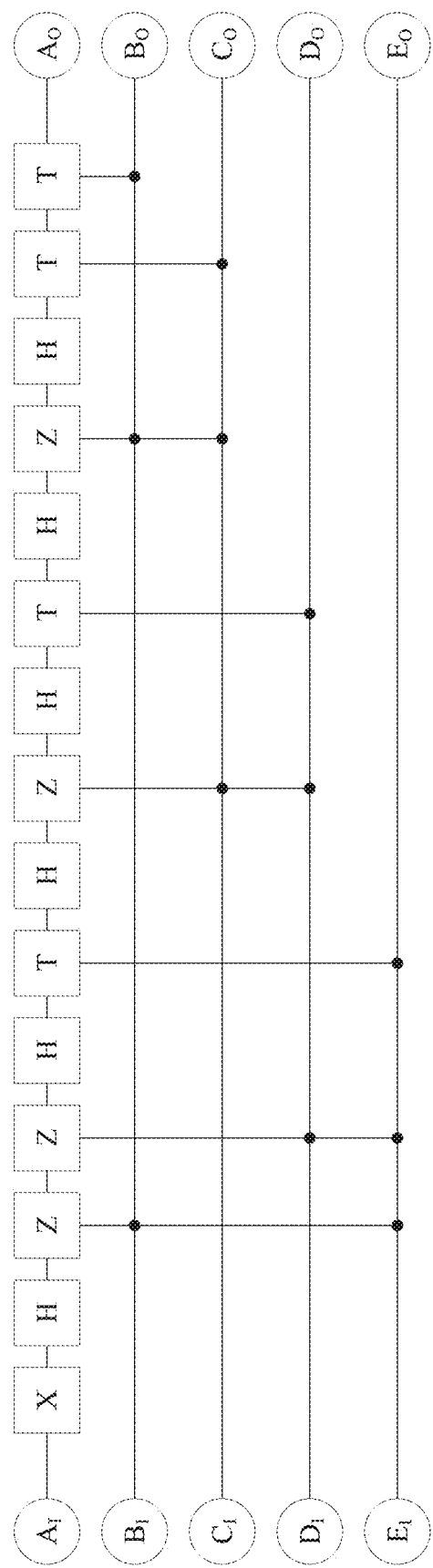
FIG. 2 illustrates an example Mod $5_4$ quantum circuit.

FIG. 2 is a simplified diagram illustrating one possible series of quantum gates that implement the Mod $5_4$ circuit. According to FIG. 2, the Mod $5_4$ circuit can be implemented as a sequence of 15 gates operating on 5 qubits. In particular, these 15 gates are composed of Pauli X gates (X), Pauli Z gates (Z), Hadamard gates (H), and Toffoli gates (T). These 15 gates operate on the states of qubits A, B, C, D, and E to change the qubits' upon being input into the circuit (shown as $A_I$, $B_I$, $C_I$, $D_I$, and $E_I$) into the corresponding output state (shown as $A_O$, $B_O$, $C_O$, $D_O$, and $E_O$) dictated by the Mod $5_4$ circuit for the qubits' input state.

If Tpar is used to optimize a Mod $5_4$ circuit (e.g., the Mod $5_4$ circuit of FIG. 2), the T-count is reduced to 16, which is suboptimal. However, in the Mod $5_4$ circuit there are several appearances of (I⊗H)CNOT(I⊗H), which are really CZ gates in disguise (e.g., (I⊗H)CNOT(I⊗H)=CZ. If each occurrence of (I⊗H)CNOT(I⊗H) is rewritten as (S⊗S)CNOT(I⊗S†)CNOT (a CNOT+S circuit) using the transformation CZ=(S⊗S)CNOT(I⊗S†)CNOT before using Tpar to optimize the a Mod $5_4$ circuit, the T-count is reduced to 8. This is because the transformation allows the explicit transformations Tpar uses to recognize that (I⊗H)CNOT(I⊗H) is really equivalent to a CZ gate. The present disclosure overcomes these limitations of conventional methods and demonstrates a way to obtain a quantum circuit having an optimal T-count or T-depth. The present disclosure overcomes limitations of conventional methods by not explicitly using any transformations such as CZ=(S⊗S)CNOT(I⊗S†)CNOT. Instead, embodiments of the present disclosure may transform a quantum circuit into an equivalent circuit in the form of $U=e^{i\Phi}(\Pi_{j=1}^m R(P_j))C_0$ (or $U'=e^{i\Phi}(\Pi_{j=1}^m R(P_j \otimes Q_j))$ $(C_0 \otimes I^{\otimes t})$), which essentially represents a circuit as the product of a series of $$\frac{\pi}{4} -$$

rotations around Pauli operators conjugated with a Clifford operator. By using relations available to a circuit in this form, such as commutation relation $$[R(P), R(Q)] = 0 \Leftrightarrow [P, Q] = 0 \text{ and}$$

$$(P)R(-P) = I, R(P)R(P) = R(P)^2 = \frac{1+i}{2}(1-iP) \in C_n,$$

embodiments of the present disclosure may reduce the T-count of a quantum circuit. This means equivalent gates and combinations of gates in a quantum circuit are treated the same way, which may ensure that the representation of a circuit does not affect the optimization result.

To understand how the present disclosure may reduce the T-count of a quantum circuit, it is helpful to have an understanding of how a Clifford+T circuit may be modified without altering the algorithm the Clifford+T circuit is implementing (e.g., without altering its black box behavior). To start, assume an arbitrary unitary gate U in an n-qubit system has an exact representation over the Clifford+T gate set. Then, there exist Clifford operators $C_0', C_1', \ldots, C_k'$ such that $U=C_0'(T_{(m_1)})C_1'(T_{(m_2)}) \ldots C_{k-1}'(T_{(m_k)})C_k'$, where each $m_i \in \{1, 2, \ldots, n\}$ and each $T_{(m_i)} \in \{(T_1, T_2 \ldots T_n\}$. Based on the properties of Clifford operators, this equation can be rewritten as $U=C_0'(T_{(m_1)})C_0'^\dagger(C_0'C_1')(T_{(m_2)})(C_0'C_1')^\dagger \ldots (C_0' \ldots C_{k-1}')(T_{(m_k)})(C_0' \ldots C_{k-1}')^\dagger(C_0' \ldots C_{k-1}'C_k')$. Based again on the properties of Clifford operators, there exist Clifford gates $C_0, C_1, \ldots, C_k$ such that $C_0=C_0', C_1=C_0'C_1', \ldots, C_k=C_0'C_1' \ldots C_k'$. Using these new Clifford gates, gate U can be written as $U=C_0(T_{(m_1)})C_0^\dagger C_1(T_{(m_2)})(C_1)^\dagger \ldots (C_{k-1}(T_{(m_k)})(C_{k-1})^\dagger(C_k)$.

To reduce the number of T gates (which are much more costly than the other gates), one may rely on the fact, that, when the T gate acting on the i-th qubit (e.g., $T_i$) is conjugated by any multi-qubit Clifford C, the T gate may remain a π/4 phase rotation around a multi-qubit Pauli:

$$CT_iC^\dagger = \frac{1+e^{i\pi/4}}{2}I + \frac{1-e^{i\pi/4}}{2}CZ_iC^\dagger = R(CZ_iC^\dagger),$$

where $$R(P) = \frac{1+e^{i\pi/4}}{2}I + \frac{1-e^{i\pi/4}}{2}P, P \in \pm\mathcal{P}_n.$$

By the definition of the Clifford group, $CZ_iC^\dagger \in \mathcal{P}_n^*$, where $\mathcal{P}_n^* = \mathcal{P}_n \setminus \{I^{\otimes n}\}$. Also notice that R (I)=I, R(−I)=$e^{i\pi/4}$I. While these are not π/4 rotations, they both comprise the identity up to a phase, and thus embodiments of the present disclosure may use them in some circuit transformations. These π/4 phase rotation gates around a multi-qubit Pauli, R(P), may also be referred to as $$\frac{\pi}{4}-$$

Pauli rotation gates. Note that if $P_x=P_y$, then $R(P_x)=R(P_y)$. In other words, the only difference between $$\frac{\pi}{4}-$$

Pauli rotation gates is the Pauli operator around which they (cause the value of the qubits) to rotate. Thus, $R(P_x)_{match}$ can be unambiguously referred to as $R(P_{match})$ for simplicity.

Another way of understanding R(P) is that the set {R(P)} is invariant under commutation with any Clifford C: $CR(P)=CR(P)C^\dagger C=R(CPC^\dagger)C$. Using this equation, one can shift all Clifford gates to the back (e.g. rightmost side). This means that any Clifford+T circuit may be represented as a series of π/4 rotations followed by a Clifford (up to a global phase): $U=e^{i\Phi}(\Pi_{j=1}^m R(P_j))C_0$, where $P_j \in \pm \mathcal{P}_n^*$, $C_0 \in C_n$, and m is the number of T gates in the circuit. While transforming a Clifford+T circuit U into the form $U=e^{i\Phi}(\Pi_{j=1}^m R(P_j))C_0$ does not reduce the T-count on its own, this transformation does allow several other useful rules that do decrease the T-count to be applied. For example, $$R(P)R(-P) = I, R(P)R(P) = R(P)^2 = \frac{1+i}{2}(1-iP) \in C_n, \text{ i.e.,}$$

two opposite π/4 rotations may cancel each other, and two identical π/4 rotations may be combined into a π/2 rotation, which is a Clifford (namely, it is $CS_1C^\dagger$, for any Clifford C such that $CZ_1C^\dagger=P$ and may be shifted to the back with. Applying either transformation may reduce the T-count of the circuit by 2. Furthermore, reordering T gates may be independently useful when considering other goals of circuit optimization, such as minimizing the T-depth.

It may be rare for a Clifford+T circuit to have two π/4 rotations around the same Pauli directly adjacent to each other. However, many Clifford+T circuits may have two adjacent π/4 rotations to commute with each other. In particular, T gates operating on distinct qubits may execute their operations simultaneously, meaning that they commute. Each group of commuting T gates may be referred to as a T-cycle, and the minimum number of T-cycles is generally defined as the T-depth. Similarly, a CNOT-count may be defined.

For example, if a group of T gates (e.g., a T-cycle) may be executed in parallel, then their corresponding π/4 rotations generally all commute pairwise. In the R(P) representation, the following rotations may commute: [R(P), R(Q)]=0 ⇔[P, Q]=0. When taking this into account, embodiments of the present disclosure may find more opportunities to apply. Using the fact that two adjacent T gates commute (e.g., [R(P), R(Q)]=0 ⇔[P, Q]=0) allows one to swap adjacent π/4 rotations (e.g., T gates or $$\frac{\pi}{4}-$$

Pauli rotation gate) without affecting the result of the quantum circuit.

Applying this rotation to adjacent commuting T gates repeatedly may be equivalent to applying some permutation to all the π/4 rotations (e.g., T gates or $$\frac{\pi}{4}-$$

Pauli rotation gates) in a circuit. Although it may not be immediately obvious which permutations are permissible, there is a simple description for the set of permissible permutations obtained by regarding the structure of π/4 rotations as a directed acyclic graph (DAG). More specifically, the T-graph of a circuit U in the form of $U=e^{i\Phi}(\Pi_{j=1}^m R(P_j))C_0$ may be defined as $G_T(U)=(V, E)$, where $V=\{v_j\}$ for $j \in \{1, 2, \ldots, m\}$ and $E=\{(v_i, v_j)|[P_i, P_j] \neq 0 \wedge i<j\}$, i.e., $G_T(U)$ may have a vertex for each π/4 rotation in U, and an edge for each pair of π/4 rotations whose Pauli anti-commute with each other, with the direction of the edge determined on the order in which the two rotations appear in the original circuit. The T-graph $G_T(U)$ of a circuit is generally a DAG, since the order $v_1, \ldots, v_m$ is a topological ordering of $G_T(U)$. Indeed, by applying only the relation [R(P), R(Q)]=0 ⇔[P, Q]=0, a circuit in the form of $U=e^{i\Phi}(\Pi_{j=1}^m R(P_j))C_0$ may be transformed into $e^{i\Phi}(\Pi_{j=1}^m R(P_{pj}))$ $C_0$ if and only if $v_{p_1}, \ldots, v_{p_m}$ is a topological ordering of $G_T(U)$.

Using the properties of the T-graph $G_T(U)$, one can show that, while a group of pairwise commuting π/4 rotations cannot always be translated into a group of T gates (or $$\frac{\pi}{4}-$$

Pauli rotation gates) applied in parallel, a group of π/4 rotations (e.g., $\Pi_{j=1}^m R(P_j)$) may be translated into a Clifford+T circuit of T-depth 1 (i.e. one where all the T gates can be applied in parallel) if: (1) All $P_j$'s commute with each other, and (2) there does not exist a non-empty subset S of $\{1, \ldots, m\}$ such that $\Pi_{j \in S} P_j=\pm I$. Specifically, a group of π/4 rotations, $\Pi_{j=1}^m R(P_j)$, may be translated into a Clifford+T circuit of T-depth 1 with m ancilla qubits as long as all $P_j$'s commute with each other.

To use ancilla qubits to implement a unitary gate, however, the ancilla qubits should return to a constant state at the end of the circuit, or otherwise the output state may be entangled with the ancilla instead of being a pure state. One way to satisfy this condition is to ensure that, when the circuit is transformed into the form of $U' = e^{i\Phi}(\Pi_{j=1}^m R(P_j \otimes Q_j))(C_0 \otimes I^{\otimes t})$, all the ancilla qubits stay in the state $|0\rangle$ throughout the circuit. To understand how this may work, first let $P = P_0 \otimes Q$, where $P \in \mathcal{P}_{n+t}$, $P_0 \in \mathcal{P}_n$, and $Q \in \mathcal{P}_t$. Then the following statements are equivalent: (1) $\forall |\psi\rangle \exists |\varphi\rangle R(P)(|\psi\rangle \otimes |0\rangle^{\otimes t}) = |\varphi\rangle \otimes |0\rangle^{\otimes t}$, (2) $\exists |\psi\rangle \exists |\varphi\rangle R(P)(|\varphi\rangle \otimes |0\rangle^{\otimes t}) = |\varphi\rangle \otimes |0\rangle^{\otimes t}$, (3) $Q \in \{I, Z\}^{\otimes t}$, and (4) $\forall |\psi\rangle R(P)(|\psi\rangle \otimes |0\rangle^{\otimes t}) = (R(P_0)|\psi\rangle) \otimes |0\rangle^{\otimes t}$.

By repeatedly exploiting the fact that $Q \in \{I, Z\}^{\otimes t}$ implies $\forall |\psi\rangle R(P)(|\psi\rangle \otimes |0\rangle^{\otimes t}) = (R(P_0)|\psi\rangle) \otimes |0\rangle^{\otimes t}$ (e.g., $Q \in \{I, Z\}^{\otimes t} \Rightarrow \forall |\psi\rangle R(P)(|\psi\rangle \otimes |0\rangle^{\otimes t}) = (R(P_0)|\psi\rangle) \otimes |0\rangle^{\otimes t}$) a circuit in the form of $U = e^{i\Phi}(\Pi_{j=1}^m R(P_j))C_0$ may be extended with t ancilla bits into the form $U' = e^{i\Phi}(\Pi_{j=1}^m R(P_j \otimes Q_j))(C_0 \otimes I^{\otimes t})$, where $Q_j \in \{I, Z\}^{\otimes t}$. Note that this extension satisfies $U'(|\omega\rangle \otimes |0\rangle^{\otimes t}) = (U|\psi\rangle) \otimes |0\rangle^{\otimes t}$ for all $|\psi\rangle$. Also note that adding ancilla qubits to a circuit U using the above method does not change the circuit's T-graph $G_T(U)$.

For some Clifford+T circuits, the combination of the commutation relation $[R(P), R(Q)] = 0 \Leftrightarrow [P, Q] = 0$ and the ability to reduce the T-depth of a circuit to 1 by employing only m if all $P_j$'s commute with each other may provide a powerful tool for optimizing the T-depth (with an unlimited number of ancilla qubits). For those circuits whose $P_j$'s do not all commute with each other, the minimum T-depth that can be achieved for a circuit U is exactly equal to the length (i.e., the number of vertices on) the longest path in $G_T(U)$. Suppose the longest path in $G_T(U)$ is $v_{j_1}, v_{j_2}, \ldots, V_{j_k}$. Then the minimum T-depth that can be achieved this way is k, the length of the longest path.

A T-depth of k is indeed achievable. The vertices of $G_T(U)$ may be first sorted in ascending order of the length of the longest path ending at each vertex. Because the minimum length of such path is 1, and the maximum is k, this essentially divides the vertices of $G_T(U)$ into k layers. Edges in $G_T(U)$ may only go from a layer to a later layer, not to any prior layer nor to the same layer. Therefore, this sort comprises a topological ordering and the π/4 rotations may be reordered in U accordingly. That there does not exist any edge between vertices in the same layer also means that rotations corresponding to those vertices commute with each other, so each layer may be transformed into a T-layer. The end result is a Clifford+T circuit with T-depth k. Note that the fact that the minimum T-depth that can be achieved for a circuit U is exactly equal to the length (i.e., the number of vertices on) the longest path in $G_T(U)$ the rules of transformation allowed.

Thus, embodiments of the present disclosure may reduce the spatial and temporal complexity of Clifford+T quantum circuits by reducing the T-count of the circuit. To accomplish this optimization, some embodiments of the present disclosure may begin by transforming an initial quantum circuit—the circuit to be optimized—into an intermediate quantum circuit. This may involve, for example, modifying the initial quantum circuit, which may be utilize quantum gates from the set $G_{Initial}$, where $G_{Initial}$ contains a finite number of quantum, into an equivalent Clifford+T circuit (e.g., into a circuit utilizing quantum gates from the set {H, S, CNOT, T}). Transforming the initial quantum circuit into an equivalent Clifford+T circuit may involve transforming the circuit into a sequence of Clifford gates and T gates, e.g., transforming the initial quantum circuit into the form $C_0(T_{(m_1)}) C_0^\dagger C_1 (T_{(m_2)})(C_1)^\dagger \ldots (C_{k-1}) (T_{(m_k)})(C_{k-1})^\dagger (C_k)$ for $m_i \in \{1, 2, \ldots, n\}$ and each $T_{(m_i)} \in \{T_1, T_2, \ldots, T_n\}$. Some embodiments may then further transform each T gate (e.g., each $T_{(m_j)}$) into a corresponding $$\frac{\pi}{4}$$

Pauli rotation gates (e.g., into a corresponding $R(P_j)$). Some embodiments may then further transform the sequence of Clifford gates and $$\frac{\pi}{4}$$

Pauli rotation gates (e.g., the sequence $C_0(R(P_{(m_1)})) C_0^\dagger C_1 (R(P_{(m_2)}))(C_1)^\dagger \ldots (C_{k-1}) (R(P_{(m_k)}))(C_{k-1})^\dagger (C_k)$ for $m_i \in \{1, 2, \ldots, n\}$ and each $P_{(m_j)} \in \mathcal{P}_n^*$ into a series of $$\frac{\pi}{4}$$

Pauli rotation gates followed by a Clifford gate (e.g., the series $U = e^{i\Phi}(\Pi_{j=1}^m R(P_j))C_0$, where $P_j \in \pm \mathcal{P}_n^*$, $C_0 \in C_n$, and m is the number of T gates in the circuit).

In some embodiments, transforming the initial quantum circuit into the corresponding intermediate quantum circuit (e.g., a quantum circuit in the form $e^{i\Phi}(\Pi_{j=1}^m R(P_j))C_0$ which implements the same algorithm/function/program/transformation as the initial quantum circuit) may be done through various means. In some embodiments, the initial quantum circuit may be transformed into the intermediate quantum circuit by first transforming each T gate into a $$\frac{\pi}{4}$$

Pauli rotation gate around the single-qubit Pauli Z, which is equivalent (e.g., performs the same rotation/transformation on its input qubits). One may then use the fact that the set $\{R(P)\}$ is invariant under commutation with any Clifford C (e.g., $CR(P) = CR(P)C^\dagger C = R(CPC^\dagger)C$). One may use this fact to shift all Clifford gates to the back (e.g., rightmost side) of the equation. Since a Clifford+T circuit uses only Clifford gates and T gates, having all the Clifford gates on the rightmost side means the equation is comprised of a sequence of T gates follows by a sequence of Clifford gates. Finally, based on the property of Clifford gates, there always exists a single Clifford gate which is equivalent to a sequence of Clifford gates (e.g., if the sequence of Clifford gates at the end of a quantum circuit is $C_0 C_1 \ldots C_k$, then there exists a Clifford gate C' such that $C' = C_0 C_1 \ldots C_k$). Using this fact, one can replace the sequence of Clifford gates with a single Clifford gate, thus transforming the initial quantum circuit in an equivalent quantum circuit that is a series of T gates followed by a Clifford gate.

After transforming the initial quantum circuit into the intermediate quantum circuit, some embodiments may proceed to generate an optimized quantum circuit. In some embodiments, the optimized quantum circuit may be in the form of a series of $$\frac{\pi}{4}$$

Pauli rotation gates followed by a Clifford gate (e.g., $e^{i\Phi}(\Pi_{j=1}^{m}R(P_j))C_0$). In some embodiments, the process of generating an optimized quantum circuit may involve first initializing a blank optimized quantum circuit created with an empty set of $$\frac{\pi}{4}-$$

Pauli rotation gates (e.g., having no gates or having only the identity gate $I^{\otimes n}$) followed by a Clifford operator (which implements the identity gate $I^{\otimes n}$). In other words, initialized to a circuit that does not change the input.

After initializing the optimized quantum circuit, some embodiments may proceed to select the leftmost $$\frac{\pi}{4}-$$

Pauli rotation gate from the intermediate quantum circuit. Some embodiments may then proceed to generate a new $$\frac{\pi}{4}-$$

Pauli rotation gate based on the selected $$\frac{\pi}{4}-$$

Pauli rotation gate. Specifically, some embodiments may generate a new $$\frac{\pi}{4}-$$

Pauli rotation gate $R(P_{new})$ from the selected $$\frac{\pi}{4}-$$

Pauli rotation gate $R(P_{selected})$, where $R(P_{new})=R(C_{optimized}P_{selected}C_{optimized}^{\dagger})$ (e.g., a $$\frac{\pi}{4}-$$

Pauli rotation gate around the Pauli operator of the selected $$\frac{\pi}{4}-$$

Pauli rotation gate conjugated by the Clifford gate of the optimized quantum circuit to the left and by the conjugate transpose of the Clifford gate of the optimized quantum circuit to the right). After generating the new $$\frac{\pi}{4}-$$

Pauli rotation gate, some embodiments may then insert the new $$\frac{\pi}{4}-$$

Pauli rotation gate into the rightmost side of the optimized quantum circuit's series of $$\frac{\pi}{4}-$$

Pauli rotation gates (e.g., at the end of the series $$\frac{\pi}{4}-$$

Pauli rotation gates immediately before the optimized quantum circuit's Clifford gate).

After inserting the new $$\frac{\pi}{4}-$$

Pauli rotation gate into the optimized quantum circuit, some embodiments may then proceed to scan through the optimized quantum circuit's $$\frac{\pi}{4}-$$

Pauli rotation gates (excluding the just inserted new $$\frac{\pi}{4}-$$

Pauli rotation gate) from right to left (e.g., starting with the $$\frac{\pi}{4}-$$

Pauli rotation gate closest to (and on the left of) the new $$\frac{\pi}{4}-$$

Pauli rotation gate). Some embodiments may scan through the optimized quantum circuit's $$\frac{\pi}{4}-$$

Pauli rotation gates to find to find a matching $\frac{\pi}{4}$- Pauli rotation gate before any non-commuting circuit's $\frac{\pi}{4}$- Pauli rotation gates. In other words, some embodiments may search for a matching $\frac{\pi}{4}$- Pauli rotation gate that is not separated from the new $\frac{\pi}{4}$- Pauli rotation gate by a non-commuting $\frac{\pi}{4}$- Pauli rotation gate. In some embodiments, a matching $\frac{\pi}{4}$- Pauli rotation gate may mean a $\frac{\pi}{4}$- Pauli rotation gate that is identical to the new $\frac{\pi}{4}$- Pauli rotation gate, except for possible having a different sign. In other words, if the new $\frac{\pi}{4}$- Pauli rotation gate is R(P) for $P=C_{optimized} P_{selected} C_{optimized}^{\dagger}$ (e.g., the new $\frac{\pi}{4}$- Pauli rotation gate is $R(C_{optimized} P_{selected} C_{optimized}^{\dagger}))$, then a matching $\frac{\pi}{4}$- Pauli rotation gate is R(±Q) for $Q=C_{optimized} P_{selected} C_{optimized}^{\dagger}$ (e.g., a matching $\frac{\pi}{4}$- Pauli rotation gate is $R(\pm C_{optimized} P_{selected} C_{optimized}^{\dagger}))$. In some embodiments, if a matching $\frac{\pi}{4}$- Pauli rotation gate is found, then both the matching $\frac{\pi}{4}$- Pauli rotation gate and the new $\frac{\pi}{4}$- Pauli rotation gate are removed from the optimized quantum circuit. In some embodiments, if the matching $\frac{\pi}{4}$- Pauli rotation gate is the same sign as the new $\frac{\pi}{4}$- Pauli rotation gate (e.g., if the new $\frac{\pi}{4}$- Pauli rotation gate is R(+P), then the matching $\frac{\pi}{4}$- Pauli rotation gate is R(+P) and if the new $\frac{\pi}{4}$-

Pauli rotation gate is R(−P), then the matching $\frac{\pi}{4}$ Pauli rotation gate is R(−P)), then the optimized quantum circuit's Clifford gate may be modified into a new Clifford gate, where the new Clifford gate is equivalent to the current Clifford gate conjugated on the left by the matching $\frac{\pi}{4}$ Pauli rotation gate twice (e.g., if $(C_{optimized})_{new}$ is the optimized quantum circuit's new Clifford gate and $(C_{optimized})_{Current}$ is the optimized quantum circuit's current Clifford gate, then $(C_{optimized})_{new} = R(Q)^2 (C_{optimized})_{Current}$, where $R(Q)^2 = R(Q)R(Q)$).

In some embodiments, after the process of scanning for a matching $\frac{\pi}{4}$ Pauli rotation gate is completed for the current selected $\frac{\pi}{4}$ Pauli rotation gate, then the next leftmost $\frac{\pi}{4}$ Pauli rotation gate from the intermediate quantum circuit may be selected and the above process may repeat. This may continue for each $\frac{\pi}{4}$ Pauli rotation gate from the intermediate quantum circuit until the intermediate's quantum circuit's $\frac{\pi}{4}$ Pauli rotation gates are exhausted. In some embodiments, the process of scanning for a matching $\frac{\pi}{4}$ Pauli rotation gate is completed when a matching $\frac{\pi}{4}$ Pauli rotation gate is found (and the procedure for finding a matching $\frac{\pi}{4}$ Pauli rotation gate is followed). In some embodiments, the process is completed when a non-commuting $\frac{\pi}{4}$ Pauli rotation gate is encountered (without having yet found any matching $\frac{\pi}{4}$ Pauli rotation gates). In some embodiments, the process is completed when the entire series of the optimized quantum circuit's $\frac{\pi}{4}$ Pauli rotation gates has been scanned without finding a matching $\frac{\pi}{4}$ Pauli rotation gate (before any non-commuting $\frac{\pi}{4}$ Pauli rotation gates). Note that, these last two scenarios mean that, it may happen that no matching $\frac{\pi}{4}$ Pauli rotation gates are found for one or more iterations.

In some embodiments, after the intermediate's quantum circuit's $\frac{\pi}{4}$ Pauli rotation gates are exhausted, then the optimized quantum circuit's Clifford gate may be modified into a new Clifford gate, where the new Clifford gate is equivalent to the current Clifford gate conjugated on the right by the intermediate quantum circuit's Clifford gate (e.g., if $(C_{optimized})_{new}$ is the optimized quantum circuit's new Clifford gate, $(C_{optimized})_{current}$ is the optimized quantum circuit's current Clifford gate, and $(C_{Intermediate})_{current}$ is the intermediate quantum circuit's current Clifford gate, then $(C_{optimized})_{new} = (C_{optimized})_{current} (C_{Intermediate})_{current}$).

Figure 3:
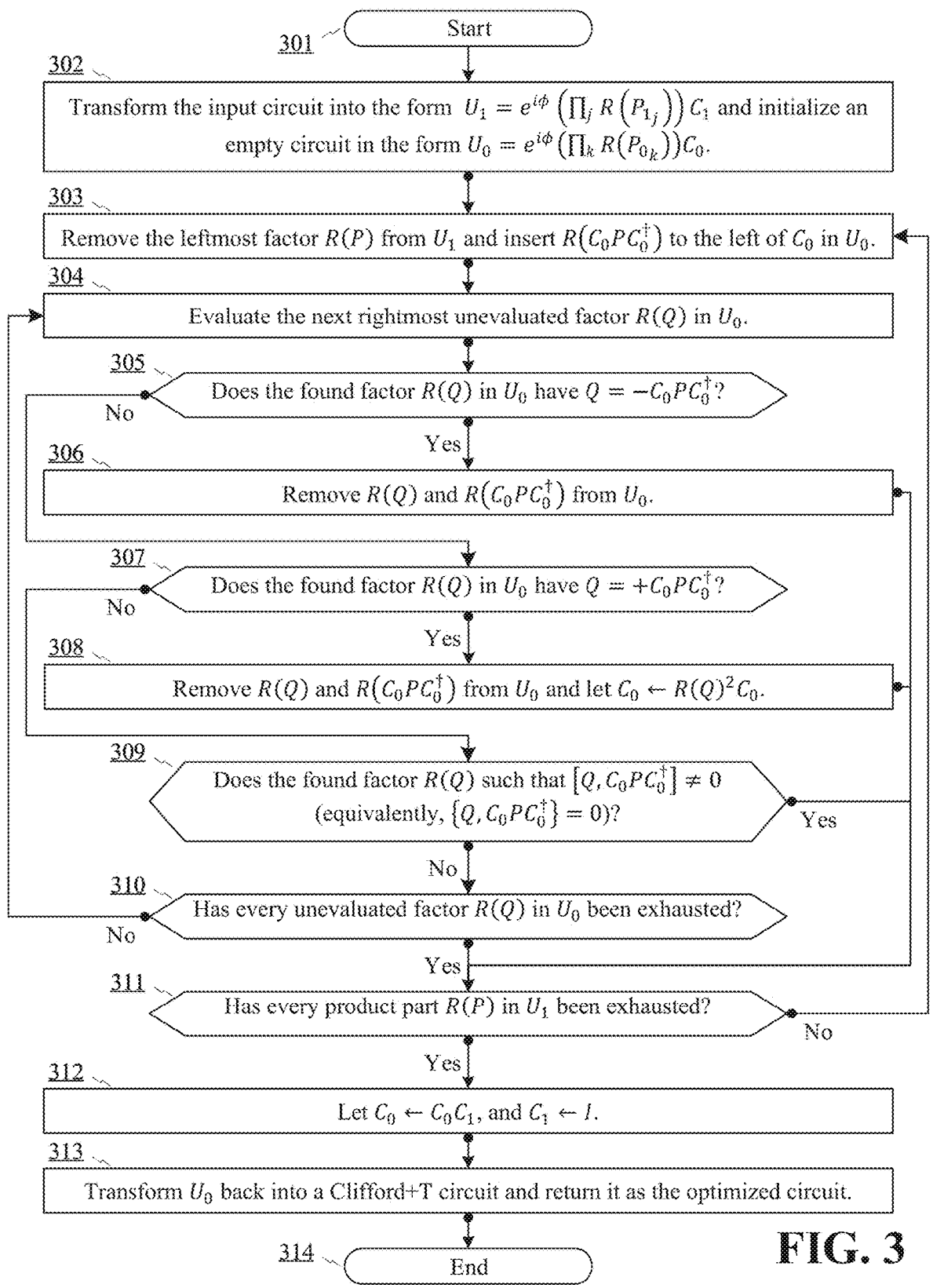
FIG. 3 is a flowchart of an exemplary method how a quantum circuit may be updated, according to some embodiments of the present disclosure.

FIG. 3 is a flowchart of the exemplary method how a quantum circuit may be optimized, according to some embodiments of the present disclosure. As shown by FIG. 3, in step 302, the initial quantum circuit (shown here as $U_1$) is transformed into the form of $U_1 = e^{i\Phi}(\Pi_j R(P_{1_j})) C_1$, e.g., into a series of rotation gates around Pauli operators followed by a Clifford gate. Also shown in step 302 is the initialization of the (empty) optimized quantum circuit (shown here as $U_0$), which is in the form $U_0 = e^{i\Phi}(\Pi_k R(P_{0_k})) C_0$, with k initially equal to 0, e.g., there set of rotation gates is initially empty, and with $C_0$ initially equal to $I^{\otimes n}$. The phase factor $e^{i\Phi}$ for $U_0$ and $U_1$ is ignored and $U_0 U_1$ should be loop invariant. Then, in step 303, the leftmost rotation gate (factor) R(P) is removed from $U_1$, e.g., the next rotation gate remaining is removed from the initial quantum circuit. Also shown in step 303, after the leftmost rotation gate R(P) is removed from $U_1$, a new rotation gate $R(C_0 P C_0^\dagger)$ is inserted to the left of $C_0$ in $U_0$, e.g., the new rotation gate $R(C_0 P C_0^\dagger)$ is inserted as the rightmost rotation gate in $U_0$.

After step 303, in step 304, the rightmost unevaluated factor R(Q) in $U_0$ (starting with the R(Q) to the immediate left of the just inserted rotation gate $R(C_0 P C_0^\dagger)$) is evaluated. In step 305, it is then determined if the found factor R(Q) has $Q = -C_0 P C_0^\dagger$. If the found factor R(Q) does have $Q = -C_0 P C_0^\dagger$, then in step 306, R(Q) and $R(C_0 P C_0^\dagger)$ are removed from $U_0$. After step 306, the method then proceeds to step 311. Alternatively, if in step 305 if the found factor R(Q) does not have $Q = -C_0 P C_0^\dagger$, then in step 307 it is determined if the found factor R(Q) has $Q = +C_0 P C_0^\dagger$. If the found factor R(Q) does have $Q = +C_0 P C_0^\dagger$, then in step 308 (Q) and $R(C_0 P C_0^\dagger)$ are removed from $U_0$ and $C_0$ is replaced with a new Clifford gate $R(Q)^2 C_0$ (e.g., $C_0 \leftarrow R(Q)^2 C_0$). After step 308, the method then proceeds to step 311. Alternatively, if in step 307 the found factor R(Q) does not have $Q = +C_0 P C_0^\dagger$, then in step 309 it is determined if the found factor R(Q) has Q such that $[Q, C_0 P C_0^\dagger] \neq 0$ (or, equivalently, $\{Q, C_0 P C_0^\dagger\} = 0$).

If the found factor R(Q) does have Q such that $[Q, C_0 P C_0^\dagger] \neq 0$, then the method proceeds to step 311. Alternatively, if in step 309 it is determined the found factor R(Q) does not have Q such that $[Q, C_0 P C_0^\dagger] \neq 0$, then in in step 310 it is determined if every unevaluated factor R(Q) in $U_0$ has been exhausted. If every unevaluated factor R(Q) in $U_0$ has not been exhausted, then the method returns to step 304 to evaluate the next rightmost factor R(Q) in $U_0$. Alternatively, if in step 310 it is determined that every unevaluated factor R(Q) in $U_0$ has been exhausted, then in step 311 it is determined if every product part R(P) in $U_1$ has been exhausted. If every product part R(P) in $U_1$ has not been exhausted, then the method returns to step 303 to manage the next leftmost factor R(P) in $U_1$. Alternatively, if in step 311 it is determined that every product part R(P) in $U_1$ has been exhausted, then in step 312, $C_0$ is replaced with a new Clifford gate $C_0 C_1$ (e.g., $C_0 \leftarrow C_0 C_1$) and $C_1$ is replaced with a new Clifford gate $I^{\otimes n}$ (e.g., $C_1 \leftarrow I$). Then in step 313, $U_0$ is transformed back into a Clifford+T circuit and returned as the optimized quantum circuit.

With regards to the efficiency of the exemplary method discussed in FIG. 3, the act of scanning through each factor R(Q) in $U_0$ (until one of the stopping conditions is met) for each factor R(P) in $U_1$ is, generally, the limiting factor on efficiency for this example algorithm. In the worst case, for each R(P) factor in the initial quantum circuit, the algorithm may scan through every R(Q) factor in $U_0$, checking equality and commutativity each time. Therefore, the worst-case complexity is $O(m^2 n)$, where n is the number of qubits and m is the number of T gates in the original circuit.

FIG. 4 depicts benchmarking results for an exemplary embodiment of the present disclosure (e.g., the algorithm described in FIG. 3) in optimizing a quantum circuit. As shown by FIG. 4, the benchmarking results for an exemplary embodiment of the present disclosure (shown in the rightmost column as Toptimizer) demonstrate that the output circuit optimized by the algorithm averaged a 42.67% reduction in the T-count when compared to the original, unoptimized circuit, with a 71.43% greater reduction being achieved for some circuits. FIG. 4 also shows that, unlike other T-count optimizers which usually cause significant increases in the CNOT-count of the optimized circuit compared to the original, unoptimized circuit, embodiments of the present disclosure often do not increase CNOT-count in the process of reducing T-count. Furthermore, one may apply the exemplary embodiment to optimized quantum circuits generated from other quantum circuit optimization tools, no matter if they optimize CNOT-count or T-count, to further optimize the circuit (e.g., produce an even smaller T-count) without affecting other performance parameters (like CNOT-count).

Figure 5:
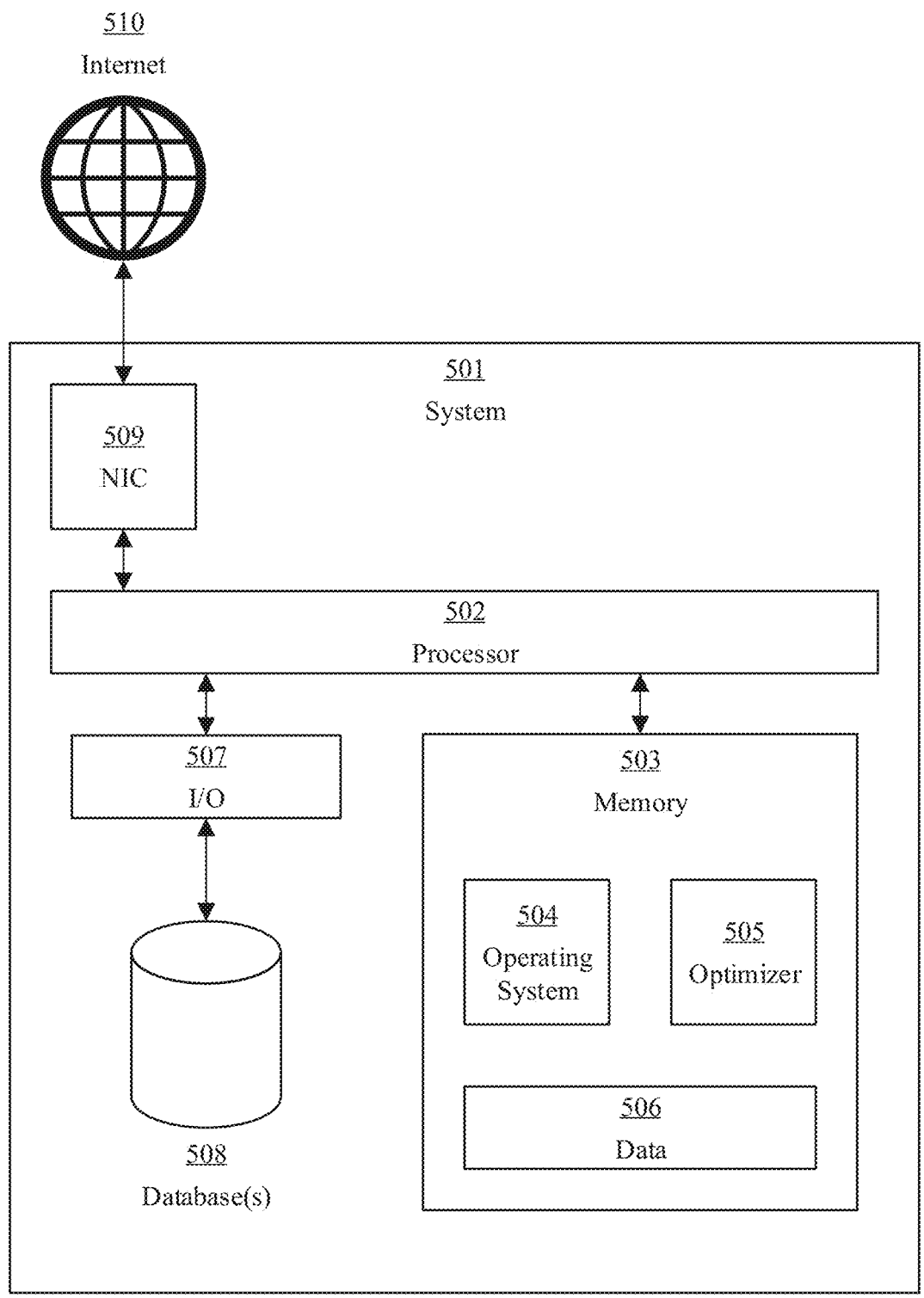
FIG. 5 depicts an example system for updating a quantum circuit, according to some embodiments of the present disclosure.

FIG. 5 is a depiction of an example system 501 for optimizing a quantum circuit, consistent with some embodiments of the present disclosure. Although depicted as a server in FIG. 5, system 500 may comprise any computer, such as a desktop computer, a laptop computer, a tablet, or the like, configured to execute, for example, the optimization methods described in FIG. 5 above. As depicted in FIG. 5, system 501 may have a processor 502. Processor 502 may comprise a single processor or a plurality of processors. For example, processor 502 may comprise a CPU, a GPU, a reconfigurable array (e.g., an FPGA or other ASIC), or the like. Processor 502 may be in operable connection with a memory 503, an input/output module 507, and a network interface controller (NIC) 509.

Memory 503 may comprise a single memory or a plurality of memories. In addition, memory 503 may comprise volatile memory, non-volatile memory, or a combination thereof. As depicted in FIG. 5, memory 503 may store one or more operating systems 504 and an optimizer 505. For example, optimizer 505 may include instructions to optimize a quantum circuit (e.g., as explained above). Therefore, optimizer 505 may simulate and optimize one or more quantum circuits according to any of the methods described above. Input/output module (I/O) 507 may store and retrieve data from one or more databases 508. For example, database(s) 508 may include data structures describing quantum circuits and data structures describing equivalent sets of T gates and Clifford gates for substitution in quantum circuits. NIC 509 may connect system 501 to one or more computer networks. As illustrated by FIG. 5, NIC 509 may connects system 501 to the Internet 510. System 501 may receive data and instructions over a network using NIC 509 and may transmit data and instructions over a network using NIC 509.

In some embodiments, the initial quantum circuit—the quantum circuit to be optimized—may be acquired by various means. For example, in some embodiments the initial quantum circuit may be acquired as input to a program. This input could come in a variety of forms, both in how the input is represented (e.g., the data structure involved) and what the input represents (e.g., what quantum circuit representation the input is using). In other embodiments, the quantum circuit could be directly created within the program performing the optimization. Additionally, as mentioned above, how the quantum circuit is represented my vary. For example, the quantum circuit could be represented as a collection of quantum gates and the connections between them, as a graph, or as some other representation. Additionally, equivalent quantum circuits may be described by using different types of gates (or the same types of gates but different amount and/or connections).

Note that, as used herein, terns such as "transform," "generate," "insert," "remove," and the like do not necessarily mean changes to a physical quantum circuit, device, or object. For example, in some embodiments, the initial quantum circuit and the optimized quantum circuit may be diagrams or other representations of quantum circuits, rather than physical objects. In some embodiments, the representations of a quantum circuit could be a variety of types. For example, a quantum circuit be represented using various data structures, could be represented graphically, could be represented as a series of matrixes, and the like. Additionally, some embodiments may deal with optimizing the layout of physical quantum circuits, such as by manipulating a quantum analog of a field-programmable gate array (FPGA).

Additionally, some embodiments may optimize a quantum circuit in place, whereas other embodiments may use auxiliary quantum circuits as part of the optimization process. For example, in some embodiments, transforming an initial quantum circuit into an intermediate quantum circuit may involve altering the initial quantum circuit into the intermediate quantum circuit (e.g., overwriting the representation of the initial quantum circuit into the intermediate quantum circuit). In contrast, in some embodiments, transforming an initial quantum circuit into an intermediate quantum circuit may involve generating a new quantum circuit which is then transformed into the intermediate quantum circuit (e.g., by using the initial quantum circuit as a template). Similarly, in some embodiments generating an optimized quantum circuit may involve editing the intermediate quantum circuit in place while in other embodiments generating an optimized quantum circuit may involve generating a new quantum circuit which is then transformed into the optimized quantum circuit. This same process may apply to any quantum circuit transformations.

Relatedly, in some embodiments, selecting the leftmost $$\frac{\pi}{4}$$

Pauli rotation gate from the intermediate quantum circuit may involve removing the leftmost $$\frac{\pi}{4}$$

Pauli rotation gate from the intermediate quantum circuit. In some embodiments, the leftmost $$\frac{\pi}{4}$$

Pauli rotation gate is not removed from the intermediate quantum circuit and the optimization proceeds to use the leftmost $$\frac{\pi}{4}$$

Pauli rotation gate that has not already be selected. Similarly, after the intermediate quantum circuit's $$\frac{\pi}{4}$$

Pauli rotation gates are exhausted are exhausted and optimized quantum circuit's Clifford gate is modified into a new Clifford gate, the intermediate quantum circuit's current Clifford gate may be modified into the identity gate (e.g., if $(C_{Intermediate})_{Current}$ is the intermediate quantum circuit's current Clifford gate, then $(C_{Intermediate})_{Current} = I^{\otimes n}$). In other embodiments, the intermediate quantum circuit's current Clifford gate may not be modified. In some embodiments, if the intermediate quantum circuit's $$\frac{\pi}{4}$$

Pauli rotation gates are removed when selected and the intermediate quantum circuit's Clifford gate is modified into the identity gate, then the intermediate quantum circuit may be a blank quantum circuit (e.g., an empty set of $$\frac{\pi}{4}$$

Pauli rotation gates (e.g., having no gates or having only identity gates $I^{\otimes n}$) followed by a Clifford operator (which implements the identity gate $I^{\otimes n}$)).

In some embodiments, the optimized quantum circuit may be returned as an optimized version of the initial quantum circuit. In some embodiments, this may involve overwriting the initial quantum circuit with the optimized quantum circuit. In other embodiments, this may involve writing or otherwise delivering the optimized quantum circuit as a new circuit. In some embodiments, the optimized quantum circuit may be returned without further transformations. In some embodiments, the optimized quantum circuit may be transformed before being returned. In some embodiments, the optimized quantum circuit may have some additional optimizations applied before being returned. For example, in some embodiments the optimized quantum circuit may be transformed into a Clifford+T circuit before being returned. In some embodiments, after being transformed into a Clifford+T circuit, or in lieu of being transformed into a Clifford+T circuit, the optimized quantum circuit may be transformed into the pre-initial quantum circuit.

In some embodiments, the initial quantum circuit may be modified before being converted into the intermediate quantum circuit. In some embodiments, the initial quantum circuit may be transformed into different representations before being transformed into the intermediate quantum circuit. Additionally, in some embodiments, the initial quantum circuit may have other optimizations applied before being transformed into the intermediate quantum circuit. For example, in some embodiments the initial quantum circuit may be representable (e.g., able to be approximated to an arbitrary degree of precision) as a Clifford+T circuit. However, in some embodiments, the initial quantum circuit may not be exactly representable by a Clifford+T circuit (e.g., cannot be approximated to an arbitrary degree of precision using only Clifford gates and T gates).

In some embodiments, when the initial quantum circuit is not exactly representable by a Clifford+T circuit, the initial quantum circuit may be first modified into a form that is representable by a Clifford+T circuit by using ancilla qubits. This modified initial quantum circuit may then be transformed into the intermediate quantum circuit as discussed above. The process of modifying an initial quantum circuit that is not exactly representable by a Clifford+T circuit into a form that is representable by a Clifford+T circuit by using ancilla qubits may involve various methods. For example, in some embodiments, an exhaustive search may be employed to find a Clifford+T circuit representation using ancilla bits. In some embodiments, if the initial quantum circuit is based on phase estimations, phase kickback tricks may introduce ancillary qubits to perform phase gates. Additionally, in some embodiments the Solovay-Kitaev algorithm may be employed to find a Clifford+T circuit representation using ancilla bits that implement the initial quantum circuit up to an accuracy of $\epsilon$.

In some embodiments, the intermediate quantum circuit may have transformations applied during the optimization process. In some embodiments, the intermediate quantum circuit may have some additional optimizations applied during the optimization process. In some of these embodiments, the intermediate quantum circuit is transformed back into the appropriate form before continuing the optimization procedure. In other words, if the intermediate quantum circuit is transformed or otherwise optimized during the optimization procedure and is taken out of the form $e^{i\phi}(\Pi_{j=1}^{m}R(P_j))C_0$, then the circuit is transformed back into the form $e^{i\phi}(\Pi_{j=1}^{m}R(P_j))C_0$ before the optimization procedure is continued.

Some embodiments may reduce the number of T gates in a quantum circuit by transforming the initial quantum circuit's representation into a ZX-diagram and then employing phase teleoperation techniques.

Some embodiments may modulate their optimizations for increased efficiency (e.g., reducing the initial quantum circuit's T-count) with limitations imposed by the target quantum hardware the quantum circuit may be implemented on. For example, some embodiments may actively taking into account specific hardware constraints of targeted hardware when optimizing, such as accounting for the connectivity map and error variance, utilizing extra ancillary qubits to further reduce T-count (since it is typically worth sacrificing a few qubits to reduce cost and further improve performance on the hardware), or the like.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The foregoing descriptions have been presented for purposes of illustration. They are not exhaustive and are not limited to precise forms or embodiments disclosed. Modifications and adaptations of the embodiments will be apparent from consideration of the specification and practice of the disclosed embodiments. For example, the described implementations include hardware, but systems and methods consistent with the present disclosure can be implemented with hardware and software. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps or inserting or deleting steps.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The embodiments may further be described using the following clauses:

1. A method for updating a quantum circuit, comprising:

transforming an initial quantum circuit into a corresponding intermediate quantum circuit, wherein the intermediate quantum circuit is a first set of $$\frac{\pi}{4}\text{-}$$

Pauli rotation gates followed by a first Clifford gate; and generating an updated quantum circuit having a second set of $$\frac{\pi}{4}\text{-}$$

Pauli rotation gates followed by a second Clifford gate, by, for each $$\frac{\pi}{4}\text{-}$$

Pauli rotation gate in the first set of $$\frac{\pi}{4}\text{-}$$

Pauli rotation gates:
  inserting a new $$\frac{\pi}{4}\text{-}$$

Pauli rotation gate after the second set of $$\frac{\pi}{4}\text{-}$$

Pauli rotation gates, wherein the new $$\frac{\pi}{4}\text{-}$$

Pauli rotation gate corresponds to the current $$\frac{\pi}{4}\text{-}$$

Pauli rotation gate in the first set of $$\frac{\pi}{4}\text{-}$$

Pauli rotation gates conjugated by the second Clifford gate and the conjugate transpose of the second Clifford gate, scanning through the second set of $$\frac{\pi}{4}\text{-}$$

Pauli rotation gates to determine if there is a matching $$\frac{\pi}{4}\text{-}$$

Pauli rotation gate before a non-commuting $$\frac{\pi}{4}\text{-}$$

Pauli rotation gate, and responsive to determining that there is a matching $$\frac{\pi}{4}\text{-}$$

Pauli rotation gate:
  removing the matching $$\frac{\pi}{4}\text{-}$$

Pauli rotation gate and new $$\frac{\pi}{4}\text{-}$$

Pauli rotation gate from the second set of $$\frac{\pi}{4}$$

Pauli rotation gates and, if the matching $$\frac{\pi}{4}$$

Pauli rotation gate and new $$\frac{\pi}{4}$$

Pauli rotation gate have opposite signs, replacing the second Clifford gate with a new Clifford gate, wherein the new Clifford gate corresponds to the current second Clifford gate conjugated by the new $$\frac{\pi}{4}$$

Pauli rotation gate.

2. The method of clause 1, further comprising replacing the second Clifford gate with a second new Clifford gate, wherein the second new Clifford gate is the current second Clifford gate conjugated with the first Clifford gate.

3. The method of any of clauses 1 and 2, wherein transforming the initial quantum circuit into the corresponding intermediate quantum circuit comprises:
transforming each T gate in the first quantum circuit into a corresponding $$\frac{\pi}{4}$$

Pauli rotation gate;
utilizing the invariance of $$\frac{\pi}{4}$$

Pauli rotation gates under commutation with Clifford gates to shift all Clifford gates in the first quantum circuit to the back of the equation; and
combining the Clifford gates in the first quantum circuit into a corresponding single Clifford gate.

4. The method of any of clauses 1-3, wherein the initial quantum circuit has other transformations or optimizations applied before transforming the initial quantum circuit into the corresponding intermediate circuit.

5. The method of clause 4, wherein the initial quantum circuit is not exactly representable by a Clifford+T circuit and further comprising:
before transforming the initial quantum circuit into the corresponding intermediate quantum circuit, transforming the initial quantum circuit into a form that is representable by a Clifford+T circuit.

6. The method of clause 5, wherein transforming the initial quantum circuit into a form that is representable by a Clifford+T circuit involves using ancilla qubits.

7. The method of any of clauses 1-6, further comprising returning the updated quantum circuit as an updated version of the initial quantum circuit.

8. The method of clause 7, wherein the updated quantum circuit has other transformations or optimizations applied before returning the updated quantum circuit.

9. The method of clause 8, further comprising before returning the updated quantum circuit as an updated version of the initial quantum circuit, transforming the updated quantum circuit into an equivalent Clifford+T circuit.

10. The method of any of clauses 1-9, wherein determining that there is a matching $$\frac{\pi}{4}$$

Pauli rotation gate involves evaluating the efficiency gains from using the matching $$\frac{\pi}{4}$$

Pauli rotation gate balanced against the constraints of a target quantum hardware.

11. A system for updating a quantum circuit, comprising:
a memory storing a set of instructions; and
one or more processors configured to execute the set of instructions to cause the system to perform:
transforming an initial quantum circuit into a corresponding intermediate quantum circuit, wherein the intermediate quantum circuit is a first set of $$\frac{\pi}{4}$$

Pauli rotation gates followed by a first Clifford gate; and
generating an updated quantum circuit having a second set of $$\frac{\pi}{4}$$

Pauli rotation gates followed by a second Clifford gate, by, for each $$\frac{\pi}{4}$$

Pauli rotation gate in the first set of $$\frac{\pi}{4}$$

Pauli rotation gates: inserting a new $$\frac{\pi}{4}$$

Pauli rotation gate after the second set of $$\frac{\pi}{4}$$

Pauli rotation gates, wherein the new $$\frac{\pi}{4}$$

Pauli rotation gate corresponds to the current $$\frac{\pi}{4}$$

Pauli rotation gate in the first set of $$\frac{\pi}{4}$$

Pauli rotation gates conjugated by the second Clifford gate and the conjugate transpose of the second Clifford gate, scanning through the second set of $$\frac{\pi}{4}$$

Pauli rotation gates to determine if there is a matching $$\frac{\pi}{4}$$

Pauli rotation gate before a non-commuting $$\frac{\pi}{4}$$

Pauli rotation gate, and responsive to determining that there is a matching $$\frac{\pi}{4}$$

Pauli rotation gate: removing the matching $$\frac{\pi}{4}$$

Pauli rotation gate and new $$\frac{\pi}{4}$$

Pauli rotation gate from the second set of $$\frac{\pi}{4}$$

Pauli rotation gates and, if the matching $$\frac{\pi}{4}$$

Pauli rotation gate and new $$\frac{\pi}{4}$$

Pauli rotation gate have opposite signs, replacing the second Clifford gate with a new Clifford gate, wherein the new Clifford gate corresponds to the current second Clifford gate conjugated by the new $$\frac{\pi}{4}$$

Pauli rotation gate.

12. The system of clause 11, wherein the set of instructions is executable by the one or more processors to cause the system to further perform:

replacing the second Clifford gate with a second new Clifford gate, wherein the second new Clifford gate is the current second Clifford gate conjugated with the first Clifford gate.

13. The system of any of clauses 11 and 12, wherein transforming the initial quantum circuit into the corresponding intermediate quantum circuit comprises:

transforming each T gate in the first quantum circuit into a corresponding $$\frac{\pi}{4}$$

Pauli rotation gate;

utilizing the invariance of $$\frac{\pi}{4}$$

Pauli rotation gates under commutation with Clifford gates to shift all Clifford gates in the first quantum circuit to the back of the equation; and combining the Clifford gates in the first quantum circuit into a corresponding single Clifford gate.

14. The system of any of clauses 11-13, wherein the initial quantum circuit is not exactly representable by a Clifford+T circuit and wherein the set of instructions is executable by the one or more processors to cause the system to further perform:

before transforming the initial quantum circuit into the corresponding intermediate quantum circuit, transforming the initial quantum circuit into a form that is representable by a Clifford+T circuit.

15. The system of any of clauses 11-14, wherein the set of instructions is executable by the one or more processors to cause the system to further perform:

before returning the updated quantum circuit as an updated version of the initial quantum circuit, transforming the updated quantum circuit into an equivalent Clifford+T circuit.

16. A non-transitory computer readable medium that stores a set of instructions that is executable by at least one processor of a computer system to cause the computer system to perform a method for performing inference with a neural network, the method comprising:

transforming an initial quantum circuit into a corresponding intermediate quantum circuit, wherein the intermediate quantum circuit is a first set of $$\frac{\pi}{4}$$

Pauli rotation gates followed by a first Clifford gate; and
generating an updated quantum circuit having a second set of $$\frac{\pi}{4}$$

Pauli rotation gates followed by a second Clifford gate, by, for each $$\frac{\pi}{4}$$

Pauli rotation gate in the first set of $$\frac{\pi}{4}$$

Pauli rotation gates:
inserting a new $$\frac{\pi}{4}$$

Pauli rotation gate after the second set of $$\frac{\pi}{4}$$

Pauli rotation gates, wherein the new $$\frac{\pi}{4}$$

Pauli rotation gate corresponds to the current $$\frac{\pi}{4}$$

Pauli rotation gate in the first set of $$\frac{\pi}{4}$$

Pauli rotation gates conjugated by the second Clifford gate and the conjugate transpose of the second Clifford gate,
scanning through the second set of $$\frac{\pi}{4}$$

Pauli rotation gates to determine if there is a matching $$\frac{\pi}{4}$$

Pauli rotation gate before a non-commuting $$\frac{\pi}{4}$$

Pauli rotation gate, and
responsive to determining that there is a matching $$\frac{\pi}{4}$$

Pauli rotation gate:
removing the matching $$\frac{\pi}{4}$$

Pauli rotation gate and new $$\frac{\pi}{4}$$

Pauli rotation gate from the second set of $$\frac{\pi}{4}$$

Pauli rotation gates and, if the matching $$\frac{\pi}{4}$$

Pauli rotation gate and new $$\frac{\pi}{4}$$

Pauli rotation gate have opposite signs, replacing the second Clifford gate with a new Clifford gate, wherein the new Clifford gate corresponds to the current second Clifford gate conjugated by the new $$\frac{\pi}{4}$$

Pauli rotation gate.

17. The non-transitory computer readable medium of clause 16, wherein the set of instructions is executable by the at least one processor of the computer system to cause the computer system to further perform:
replacing the second Clifford gate with a second new Clifford gate, wherein the second new Clifford gate is the current second Clifford gate conjugated with the first Clifford gate.

18. The non-transitory computer readable medium of any of clauses 16 and 17, wherein transforming the initial quantum circuit into the corresponding intermediate quantum circuit comprises:
transforming each T gate in the first quantum circuit into a corresponding $$\frac{\pi}{4}$$

Pauli rotation gate;
utilizing the invariance of $$\frac{\pi}{4}$$

Pauli rotation gates under commutation with Clifford gates to shift all Clifford gates in the first quantum circuit to the back of the equation; and
combining the Clifford gates in the first quantum circuit into a corresponding single Clifford gate.

19. The non-transitory computer readable medium of any of clauses 16-18, wherein the initial quantum circuit is not exactly representable by a Clifford+T circuit and wherein the set of instructions is executable by the at least one processor of the computer system to cause the computer system to further perform:

before transforming the initial quantum circuit into the corresponding intermediate quantum circuit, transforming the initial quantum circuit into a form that is representable by a Clifford+T circuit.

20. The non-transitory computer readable medium of any of clauses 16-19, wherein the set of instructions is executable by the at least one processor of the computer system to cause the computer system to further perform:
before returning the updated quantum circuit as an updated version of the initial quantum circuit, transforming the updated quantum circuit into an equivalent Clifford+T circuit.

In the drawings and specification, there have been disclosed exemplary embodiments. However, many variations and modifications can be made to these embodiments. Accordingly, although specific terms are employed, they are used in a generic and descriptive sense only and not for purposes of limitation or restriction of the scope of the embodiments, the scope being defined by the following claims.

What is claimed is:
1. A method for updating a quantum circuit, comprising:
transforming an initial quantum circuit into a corresponding intermediate quantum circuit, wherein the intermediate quantum circuit is a first set of

$$\frac{\pi}{4}$$

Pauli rotation gates followed by a first Clifford gate; and
generating an updated quantum circuit having a second set of $$\frac{\pi}{4}$$

Pauli rotation gates followed by a second Clifford gate, by, for each $$\frac{\pi}{4}$$

Pauli rotation gate in the first set of $$\frac{\pi}{4}$$

Pauli rotation gates:
inserting a new $$\frac{\pi}{4}$$

Pauli rotation gate after the second set of $$\frac{\pi}{4}$$

Pauli rotation gates, wherein the new $\frac{\pi}{4}$ Pauli rotation gate corresponds to the current $\frac{\pi}{4}$ Pauli rotation gate in the first set of $\frac{\pi}{4}$ Pauli rotation gates conjugated by the second Clifford gate and the conjugate transpose of the second Clifford gate, scanning through the second set of $\frac{\pi}{4}$ Pauli rotation gates to determine if there is a matching $\frac{\pi}{4}$ Pauli rotation gate before a non-commuting $\frac{\pi}{4}$ Pauli rotation gate, and responsive to determining that there is a matching $\frac{\pi}{4}$ Pauli rotation gate:

removing the matching $\frac{\pi}{4}$ Pauli rotation gate and new $\frac{\pi}{4}$ Pauli rotation gate from the second set of $\frac{\pi}{4}$ Pauli rotation gates and, if the matching $\frac{\pi}{4}$ Pauli rotation gate and new $\frac{\pi}{4}$ Pauli rotation gate have opposite signs, replacing the second Clifford gate with a new Clifford gate, wherein the new Clifford gate corresponds to the current second Clifford gate conjugated by the new $\frac{\pi}{4}$ Pauli rotation gate.

2. The method of claim 1, further comprising replacing the second Clifford gate with a second new Clifford gate, wherein the second new Clifford gate is the current second Clifford gate conjugated with the first Clifford gate.

3. The method of claim 1, wherein transforming the initial quantum circuit into the corresponding intermediate quantum circuit comprises:
transforming each T gate in the first quantum circuit into a corresponding $\frac{\pi}{4}$ Pauli rotation gate;
utilizing the invariance of $\frac{\pi}{4}$ Pauli rotation gates under commutation with Clifford gates to shift all Clifford gates in the first quantum circuit to the back of the equation; and
combining the Clifford gates in the first quantum circuit into a corresponding single Clifford gate.

4. The method of claim 1, wherein the initial quantum circuit has other transformations or optimizations applied before transforming the initial quantum circuit into the corresponding intermediate circuit.

5. The method of claim 4, wherein the initial quantum circuit is not exactly representable by a Clifford+T circuit and further comprising:
before transforming the initial quantum circuit into the corresponding intermediate quantum circuit, transforming the initial quantum circuit into a form that is representable by a Clifford+T circuit.

6. The method of claim 5, wherein transforming the initial quantum circuit into a form that is representable by a Clifford+T circuit involves using ancilla qubits.

7. The method of claim 1, further comprising returning the updated quantum circuit as an updated version of the initial quantum circuit.

8. The method of claim 7, wherein the updated quantum circuit has other transformations or optimizations applied before returning the updated quantum circuit.

9. The method of claim 8, further comprising before returning the updated quantum circuit as an updated version of the initial quantum circuit, transforming the updated quantum circuit into an equivalent Clifford+T circuit.

10. The method of claim 1, wherein determining that there is a matching $$\frac{\pi}{4}$$

Pauli rotation gate involves evaluating the efficiency gains from using the matching $$\frac{\pi}{4}$$

Pauli rotation gate balanced against the constraints of a target quantum hardware.

11. A system for updating a quantum circuit, comprising:
a memory storing a set of instructions; and
one or more processors configured to execute the set of instructions to cause the system to perform:
transforming an initial quantum circuit into a corresponding intermediate quantum circuit, wherein the intermediate quantum circuit is a first set of $$\frac{\pi}{4}$$

Pauli rotation gates followed by a first Clifford gate; and
generating an updated quantum circuit having a second set of $$\frac{\pi}{4}$$

Pauli rotation gates followed by a second Clifford gate, by, for each $$\frac{\pi}{4}$$

Pauli rotation gate in the first set of $$\frac{\pi}{4}$$

Pauli rotation gates:
inserting a new $$\frac{\pi}{4}$$

Pauli rotation gate after the second set of $$\frac{\pi}{4}$$

Pauli rotation gates, wherein the new $$\frac{\pi}{4}$$

Pauli rotation gate corresponds to the current $$\frac{\pi}{4}$$

Pauli rotation gate in the first set of $$\frac{\pi}{4}$$

Pauli rotation gates conjugated by the second Clifford gate and the conjugate transpose of the second Clifford gate,
scanning through the second set of $$\frac{\pi}{4}$$

Pauli rotation gates to determine if there is a matching $$\frac{\pi}{4}$$

Pauli rotation gate before a non-commuting $$\frac{\pi}{4}$$

Pauli rotation gate, and
responsive to determining that there is a matching $$\frac{\pi}{4}$$

Pauli rotation gate:
removing the matching $$\frac{\pi}{4}$$

Pauli rotation gate and new $$\frac{\pi}{4}$$

Pauli rotation gate from the second set of $$\frac{\pi}{4}$$

Pauli rotation gates and,
if the matching $$\frac{\pi}{4}$$

Pauli rotation gate and new $$\frac{\pi}{4}$$

Pauli rotation gate have opposite signs, replacing the second Clifford gate with a new Clifford gate, wherein the new Clifford gate corresponds to the current second Clifford gate conjugated by the new $$\frac{\pi}{4}$$

Pauli rotation gate.

12. The system of claim 11, wherein the set of instructions is executable by the one or more processors to cause the system to further perform:
replacing the second Clifford gate with a second new Clifford gate, wherein the second new Clifford gate is the current second Clifford gate conjugated with the first Clifford gate.

13. The system of claim 11, wherein transforming the initial quantum circuit into the corresponding intermediate quantum circuit comprises:
transforming each T gate in the first quantum circuit into a corresponding $$\frac{\pi}{4}$$

Pauli rotation gate;
utilizing the invariance of $$\frac{\pi}{4}$$

Pauli rotation gates under commutation with Clifford gates to shift all Clifford gates in the first quantum circuit to the back of the equation; and
combining the Clifford gates in the first quantum circuit into a corresponding single Clifford gate.

14. The system of claim 11, wherein the initial quantum circuit is not exactly representable by a Clifford+T circuit and wherein the set of instructions is executable by the one or more processors to cause the system to further perform:
before transforming the initial quantum circuit into the corresponding intermediate quantum circuit, transforming the initial quantum circuit into a form that is representable by a Clifford+T circuit.

15. The system of claim 11, wherein the set of instructions is executable by the one or more processors to cause the system to further perform:
before returning the updated quantum circuit as an updated version of the initial quantum circuit, transforming the updated quantum circuit into an equivalent Clifford+T circuit.

16. A non-transitory computer readable medium that stores a set of instructions that is executable by at least one processor of a computer system to cause the computer system to perform a method for performing inference with a neural network, the method comprising:
transforming an initial quantum circuit into a corresponding intermediate quantum circuit, wherein the intermediate quantum circuit is a first set of $$\frac{\pi}{4}$$

Pauli rotation gates followed by a first Clifford gate; and
generating an updated quantum circuit having a second set of $$\frac{\pi}{4}$$

Pauli rotation gates followed by a second Clifford gate, by, for each $$\frac{\pi}{4}$$

Pauli rotation gate in the first set of $$\frac{\pi}{4}$$

Pauli rotation gates:
inserting a new $$\frac{\pi}{4}$$

Pauli rotation gate after the second set of $$\frac{\pi}{4}$$

Pauli rotation gates, wherein the new $$\frac{\pi}{4}$$

Pauli rotation gate corresponds to the current $$\frac{\pi}{4}$$

Pauli rotation gate in the first set of $$\frac{\pi}{4}$$

Pauli rotation gates conjugated by the second Clifford gate and the conjugate transpose of the second Clifford gate,
scanning through the second set of $$\frac{\pi}{4}$$

Pauli rotation gates to determine if there is a matching $$\frac{\pi}{4}$$

Pauli rotation gate before a non-commuting $$\frac{\pi}{4}$$

Pauli rotation gate, and
responsive to determining that there is a matching $$\frac{\pi}{4}$$

Pauli rotation gate:
removing the matching $$\frac{\pi}{4}$$

Pauli rotation gate and new $$\frac{\pi}{4}$$

Pauli rotation gate from the second set of $$\frac{\pi}{4}$$

Pauli rotation gates and,
if the matching $$\frac{\pi}{4}$$

Pauli rotation gate and new $$\frac{\pi}{4}$$

Pauli rotation gate have opposite signs, replacing the second Clifford gate with a new Clifford gate, wherein the new Clifford gate corresponds to the current second Clifford gate conjugated by the new $$\frac{\pi}{4}$$

Pauli rotation gate.

17. The non-transitory computer readable medium of claim 16, wherein the set of instructions is executable by the at least one processor of the computer system to cause the computer system to further perform:
replacing the second Clifford gate with a second new Clifford gate, wherein the second new Clifford gate is the current second Clifford gate conjugated with the first Clifford gate.

18. The non-transitory computer readable medium of claim 16, wherein transforming the initial quantum circuit into the corresponding intermediate quantum circuit comprises:
transforming each T gate in the first quantum circuit into a corresponding $$\frac{\pi}{4}$$

Pauli rotation gate;
utilizing the invariance of $$\frac{\pi}{4}$$

Pauli rotation gates under commutation with Clifford gates to shift all Clifford gates in the first quantum circuit to the back of the equation; and
combining the Clifford gates in the first quantum circuit into a corresponding single Clifford gate.

19. The non-transitory computer readable medium of claim 16, wherein the initial quantum circuit is not exactly representable by a Clifford+T circuit and wherein the set of instructions is executable by the at least one processor of the computer system to cause the computer system to further perform:
- before transforming the initial quantum circuit into the corresponding intermediate quantum circuit, transforming the initial quantum circuit into a form that is representable by a Clifford+T circuit.

20. The non-transitory computer readable medium of claim 16, wherein the set of instructions is executable by the at least one processor of the computer system to cause the computer system to further perform:
- before returning the updated quantum circuit as an updated version of the initial quantum circuit, transforming the updated quantum circuit into an equivalent Clifford+T circuit.

* * * * *